United States Patent
Risso et al.

(10) Patent No.: US 12,463,857 B2
(45) Date of Patent: Nov. 4, 2025

(54) NON-BINARY POLAR CODES FOR PROBABILISTIC AMPLITUDE SHAPING

(71) Applicant: QUALCOMM Incorporated, San Diego, CA (US)

(72) Inventors: Alessandro Risso, San Diego, CA (US); Shravan Kumar Reddy Garlapati, San Diego, CA (US); Afshin Haftbaradaran, San Diego, CA (US); Li Zhang, San Diego, CA (US); Wei Yang, San Diego, CA (US); Jing Jiang, San Diego, CA (US); Hari Sankar, San Diego, CA (US); Harsha Acharya, Santa Clara, CA (US); Hobin Kim, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 17 days.

(21) Appl. No.: 18/601,471

(22) Filed: Mar. 11, 2024

(65) Prior Publication Data

US 2025/0286768 A1 Sep. 11, 2025

(51) Int. Cl.
*H04L 27/34* (2006.01)
(52) U.S. Cl.
CPC ................. *H04L 27/3411* (2013.01)
(58) Field of Classification Search
CPC .................................. H04L 27/3411
See application file for complete search history.

(56) References Cited

U.S. PATENT DOCUMENTS

| | | | |
|---|---|---|---|
| 11,949,543 B1 * | 4/2024 | Sayed Hassan | .... H04L 27/2075 |
| 12,057,983 B2 * | 8/2024 | Koike-Akino | ...... H04L 27/2617 |
| 2020/0067528 A1 * | 2/2020 | Arikan | ................... H03M 13/13 |
| 2021/0067269 A1 * | 3/2021 | Chen | ..................... H03M 13/13 |
| 2022/0263694 A1 | 8/2022 | Iscan et al. | |
| 2023/0033774 A1 | 2/2023 | Koike-Akino et al. | |

(Continued)

OTHER PUBLICATIONS

Maalaoui A., "Design of Coded Modulation Schemes Based on Non-Binary LDPC Codes", HAL Open Science, Sep. 14, 2023, 127 pages.

(Continued)

*Primary Examiner* — Freshteh N Aghdam
(74) *Attorney, Agent, or Firm* — Kevin M. Donnelly; Harrity & Harrity, LLP

(57) ABSTRACT

Various aspects of the present disclosure generally relate to wireless communication. Some aspects more specifically provide procedures and configurations used to perform, at a transmitter, probabilistic amplitude shaping (PAS) of quadrature amplitude modulation (QAM) communications using non-binary polar coding (NBPC). NBPC differs from binary polar coding (BPC) in that BPC uses a binary-input channel whereas NBPC uses a non-binary input channel. For example, while BPC uses a log likelihood ratio (LLR) with a single value corresponding to a given bit to be shaped, NBPC may use a probability mass function (PMF) to define or represent amplitude shaping target values. As another example, aspects use non-binary transformations, which reduce the number of passes to shape q bits from q passes (for BPC) to 1 pass (for NBPC).

30 Claims, 11 Drawing Sheets

(56) References Cited

U.S. PATENT DOCUMENTS

2025/0184204 A1* 6/2025 Jin ..................... H04L 27/3405

OTHER PUBLICATIONS

Marshakov E., et al., "Design and Decoding of Polar Codes for the Gaussian Multiple Access Channel", arXiv:1901.07297v1 [cs.IT], Jan. 22, 2019, 5 pages.

Steiner F., et al., "Ultra-Sparse Non-Binary LDPC Codes for Probabilistic Amplitude Shaping", Globecom 2017—2017 IEEE Global Communications Conference, Dec. 4-8, 2017, 5 pages.

Bohnke R., et al., "Multi-Level Distribution Matching", IEEE Communications Letters, vol. 24, No. 9, Sep. 2020, IEEE Service Center, Piscataway, NJ, US, May 9, 2020, pp. 2015-2019, XP011807676, the whole document.

Fehenberger T., et al., "Parallel-Amplitude Architecture and Subset Ranking for Fast Distribution Matching", IEEE Transactions on Communications, vol. 68, No. 4, Apr. 2020, Service Center, Piscataway, NJ, USA, Jan. 15, 2020, pp. 1981-1990, XP011783286, section III.

International Search Report and Written Opinion—PCT/US2025/015688—ISA/EPO—May 19, 2025.

Iscan O., et al., "Probabilistically Shaped Multi-Level Coding with Polar Codes for Fading Channels", 2018 IEEE Globecom Workshops (GC Wkshps), Dec. 9, 2018, 5 pages, XP033519091, the whole document.

Karakchieva L., et al., "Design of Non-binary Polar Codes with Shaping", 2023 XVIII International Symposium Problems of Redundancy in Information and Control Systems (Redundancy), IEEE, Oct. 24, 2023, pp. 178-182, XP034481337, the whole document.

Park G., et al., "Log-domain Decoding of Nonbinary Polar Codes", 2021 International Conference on Information and Communication Technology Convergence, IEEE, Oct. 20, 2021, pp. 1271-1273, XP034039210, the whole document.

* cited by examiner

NON-BINARY POLAR CODES FOR PROBABILISTIC AMPLITUDE SHAPING

FIELD OF THE DISCLOSURE

Aspects of the present disclosure generally relate to wireless communication and specifically relate to techniques, apparatuses, and methods associated with non-binary polar codes for probabilistic amplitude shaping.

BACKGROUND

Wireless communication systems are widely deployed to provide various services that may include carrying voice, text, messaging, video, data, and/or other traffic. The services may include unicast, multicast, and/or broadcast services, among other examples. Typical wireless communication systems may employ multiple-access radio access technologies (RATs) capable of supporting communication with multiple users by sharing available system resources (for example, time domain resources, frequency domain resources, spatial domain resources, and/or device transmit power, among other examples). Examples of such multiple-access RATs include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

The above multiple-access RATs have been adopted in various telecommunication standards to provide common protocols that enable different wireless communication devices to communicate on a municipal, national, regional, or global level. An example telecommunication standard is New Radio (NR). NR, which may also be referred to as 5G, is part of a continuous mobile broadband evolution promulgated by the Third Generation Partnership Project (3GPP). NR (and other mobile broadband evolutions beyond NR) may be designed to better support Internet of things (IoT) and reduced capability device deployments, industrial connectivity, millimeter wave (mmWave) expansion, licensed and unlicensed spectrum access, non-terrestrial network (NTN) deployment, sidelink and other device-to-device direct communication technologies (for example, cellular vehicle-to-everything (CV2X) communication), massive multiple-input multiple-output (MIMO), disaggregated network architectures and network topology expansions, multiple-subscriber implementations, high-precision positioning, and/or radio frequency (RF) sensing, among other examples. As the demand for mobile broadband access continues to increase, further improvements in NR may be implemented, and other radio access technologies such as 6G may be introduced, to further advance mobile broadband evolution.

Some forms of wireless communication may use a quadrature amplitude modulated (QAM) signal. A QAM signal may be associated with a set of constellation points that may be visualized as points in a two-dimensional plane with a first axis associated with an in-phase component of the constellation point and a second axis associated with a quadrature component of the constellation point. Amplitudes of the in-phase component and the quadrature component can be manipulated.

SUMMARY

In some aspects, a method of wireless communication performed by a wireless communication device includes receiving a signal; decoding the signal; de-mapping the decoded signal to obtain a symbol vector; performing a non-binary polar transformation encoding operation on the symbol vector to obtain a set of shaping symbols and a set of data symbols; converting the set of data symbols to a set of bits of a bit vector; and providing the set of bits.

In some aspects, a non-transitory computer-readable medium stores a set of instructions for wireless communication. The set of instructions may include one or more instructions that, when executed by one or more processors of a wireless communication device, cause the wireless communication device to receive a signal. The one or more instructions, when executed by one or more processors of the wireless communication device, may cause the wireless communication device to decode the signal. The one or more instructions, when executed by one or more processors of the wireless communication device, may cause the wireless communication device to de-map the decoded signal to obtain a symbol vector. The one or more instructions, when executed by one or more processors of the wireless communication device, may cause the wireless communication device to perform a non-binary polar transformation encoding operation on the symbol vector to obtain a set of shaping symbols and a set of data symbols. The one or more instructions, when executed by one or more processors of the wireless communication device, may cause the wireless communication device to convert the set of data symbols to a set of bits of a bit vector. The one or more instructions, when executed by one or more processors of the wireless communication device, may cause the wireless communication device to provide the set of bits.

In some aspects, an apparatus for wireless communication includes means for receiving a signal. In some aspects, the apparatus includes means for decoding the signal. In some aspects, the apparatus includes means for de-mapping the decoded signal to obtain a symbol vector. In some aspects, the apparatus includes means for performing a non-binary polar transformation encoding operation on the symbol vector to obtain a set of shaping symbols and a set of data symbols. In some aspects, the apparatus includes means for converting the set of data symbols to a set of bits of a bit vector. In some aspects, the apparatus includes means for providing the set of bits.

In some aspects, a wireless communication device for wireless communication includes a processing system that includes one or more processors and one or more memories coupled with the one or more processors. The processing system may be configured to cause the wireless communication device to receive a signal. The processing system may be configured to cause the wireless communication device to decoding the signal. The processing system may be configured to cause the wireless communication device to de-map the decoded signal to obtain a symbol vector. The processing system may be configured to cause the wireless communication device to perform a non-binary polar transformation encoding operation on the symbol vector to obtain a set of shaping symbols and a set of data symbols. The processing system may be configured to cause the wireless communication device to convert the set of data symbols to a set of bits of a bit vector. The processing system may be configured to cause the wireless communication device to provide the set of bits.

Some aspects described herein relate to a method of wireless communication performed by a wireless communication device. The method may include performing a first non-binary polar transformation encoding operation on a first symbol vector, including a set of data symbols, that generates a second symbol vector including a set of transformed data symbols, the set of data symbols being associated with first locations associated with the first non-binary polar transformation. The method may include performing a non-binary polar transformation decoding operation on the second symbol vector, in accordance with a set of probability values associated with a set of amplitude shaping target values, that generates a third symbol vector including a first set of shaping symbols. The method may include performing a second non-binary polar transformation encoding operation on the third symbol vector that generates a fourth symbol vector including a second set of shaping symbols, the second set of shaping symbols being associated with second locations associated with the second non-binary polar transformation encoding operation. The method may include transmitting a signal that is modulated in accordance with a fifth symbol vector including a set of shaped symbols associated with a combination of the second symbol vector and the fourth symbol vector.

Some aspects described herein relate to a non-transitory computer-readable medium that stores a set of instructions for wireless communication by a wireless communication device. The set of instructions, when executed by one or more processors of the wireless communication device, may cause the wireless communication device to perform a first non-binary polar transformation encoding operation on a first symbol vector, including a set of data symbols, that generates a second symbol vector including a set of transformed data symbols, the set of data symbols being associated with first locations associated with the first non-binary polar transformation. The set of instructions, when executed by one or more processors of the wireless communication device, may cause the wireless communication device to perform a non-binary polar transformation decoding operation on the second symbol vector, in accordance with a set of probability values associated with a set of amplitude shaping target values, that generates a third symbol vector including a first set of shaping symbols. The set of instructions, when executed by one or more processors of the wireless communication device, may cause the wireless communication device to perform a second non-binary polar transformation encoding operation on the third symbol vector that generates a fourth symbol vector including a second set of shaping symbols, the second set of shaping symbols being associated with second locations associated with the second non-binary polar transformation encoding operation. The set of instructions, when executed by one or more processors of the wireless communication device, may cause the wireless communication device to transmit a signal that is modulated in accordance with a fifth symbol vector including a set of shaped symbols associated with a combination of the second symbol vector and the fourth symbol vector.

Some aspects described herein relate to an apparatus for wireless communication. The apparatus may include means for performing a first non-binary polar transformation encoding operation on a first symbol vector, including a set of data symbols, that generates a second symbol vector including a set of transformed data symbols, the set of data symbols being associated with first locations associated with the first non-binary polar transformation. The apparatus may include means for performing a non-binary polar transformation decoding operation on the second symbol vector, in accordance with a set of probability values associated with a set of amplitude shaping target values, that generates a third symbol vector including a first set of shaping symbols. The apparatus may include means for performing a second non-binary polar transformation encoding operation on the third symbol vector that generates a fourth symbol vector including a second set of shaping symbols, the second set of shaping symbols being associated with second locations associated with the second non-binary polar transformation encoding operation. The apparatus may include means for transmitting a signal that is modulated in accordance with a fifth symbol vector including a set of shaped symbols associated with a combination of the second symbol vector and the fourth symbol vector.

Some aspects described herein relate to a wireless communication device for wireless communication. The wireless communication device may include a processing system that includes one or more processors and one or more memories coupled with the one or more processors. The processing system may be configured to cause the wireless communication device to perform a first non-binary polar transformation encoding operation on a first symbol vector, including a set of data symbols, that generates a second symbol vector including a set of transformed data symbols, the set of data symbols being associated with first locations associated with the first non-binary polar transformation. The processing system may be configured to cause the wireless communication device to perform a non-binary polar transformation decoding operation on the second symbol vector, in accordance with a set of probability values associated with a set of amplitude shaping target values, that generates a third symbol vector including a first set of shaping symbols. The processing system may be configured to cause the wireless communication device to perform a second non-binary polar transformation encoding operation on the third symbol vector that generates a fourth symbol vector including a second set of shaping symbols, the second set of shaping symbols being associated with second locations associated with the second non-binary polar transformation encoding operation. The processing system may be configured to cause the wireless communication device to transmit a signal that is modulated in accordance with a fifth symbol vector including a set of shaped symbols associated with a combination of the second symbol vector and the fourth symbol vector.

Aspects of the present disclosure may generally be implemented by or as a method, apparatus, system, computer program product, non-transitory computer-readable medium, user equipment, base station, network node, network entity, wireless communication device, and/or processing system as substantially described with reference to, and as illustrated by, the specification and accompanying drawings.

The foregoing paragraphs of this section have broadly summarized some aspects of the present disclosure. These and additional aspects and associated advantages will be described hereinafter. The disclosed aspects may be used as a basis for modifying or designing other aspects for carrying out the same or similar purposes of the present disclosure. Such equivalent aspects do not depart from the scope of the appended claims. Characteristics of the aspects disclosed herein, both their organization and method of operation, together with associated advantages, will be better understood from the following description when considered in connection with the accompanying drawings.

BRIEF DESCRIPTION OF THE DRAWINGS

The appended drawings illustrate some aspects of the present disclosure, but are not limiting of the scope of the present disclosure because the description may enable other aspects. Each of the drawings is provided for purposes of illustration and description, and not as a definition of the limits of the claims. The same or similar reference numbers in different drawings may identify the same or similar elements.

DETAILED DESCRIPTION

Figure 1:
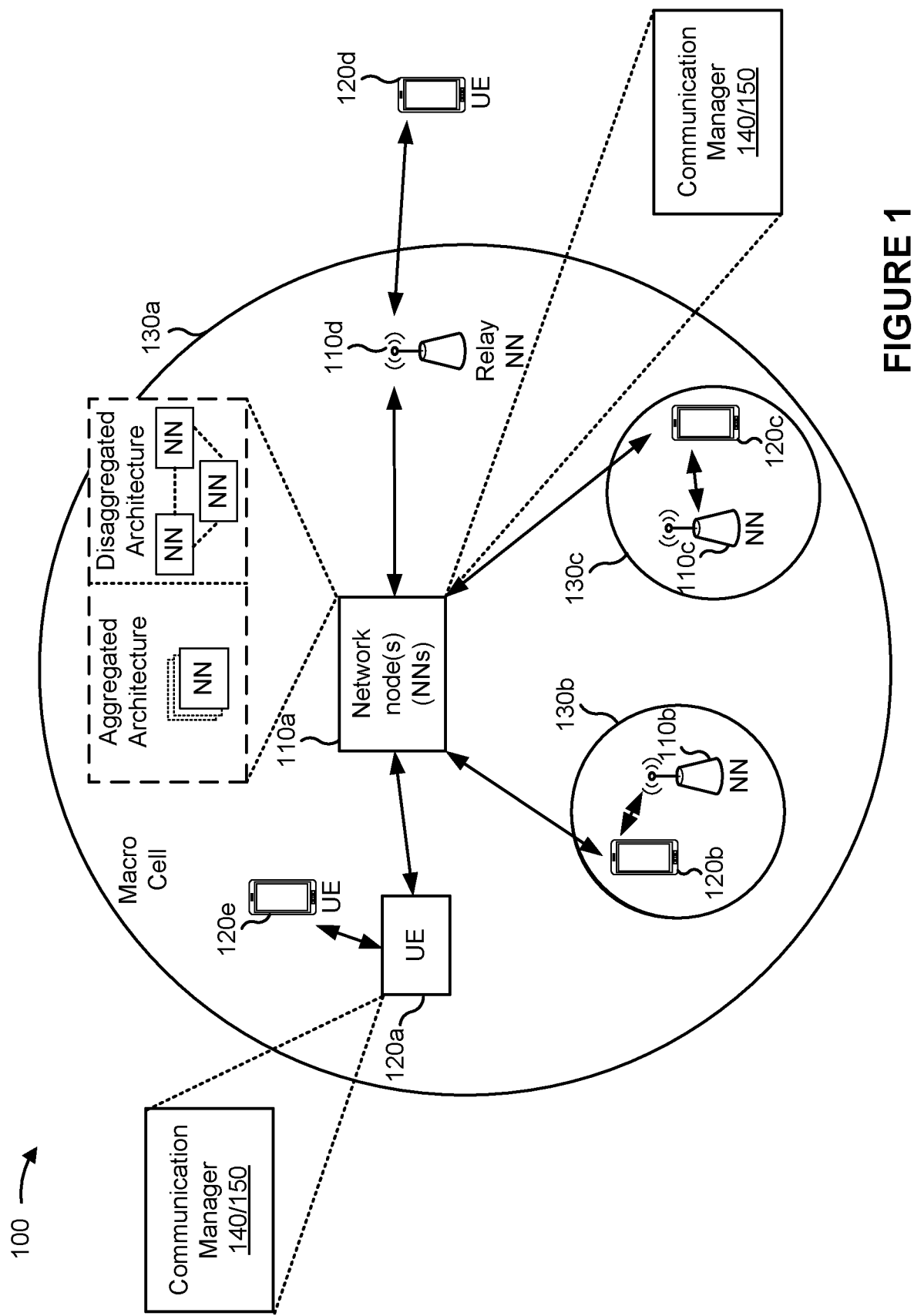
FIG. 1 is a diagram illustrating an example of a wireless communication network in accordance with the present disclosure.

Various aspects of the present disclosure are described hereinafter with reference to the accompanying drawings. However, aspects of the present disclosure may be embodied in many different forms and is not to be construed as limited to any specific aspect illustrated by or described with reference to an accompanying drawing or otherwise presented in this disclosure. Rather, these aspects are provided so that this disclosure will be thorough and complete, and will fully convey the scope of the disclosure to those skilled in the art. One skilled in the art may appreciate that the scope of the disclosure is intended to cover any aspect of the disclosure disclosed herein, whether implemented independently of or in combination with any other aspect of the disclosure. For example, an apparatus may be implemented or a method may be practiced using various combinations or quantities of the aspects set forth herein. In addition, the scope of the disclosure is intended to cover an apparatus having, or a method that is practiced using, other structures and/or functionalities in addition to or other than the structures and/or functionalities with which various aspects of the disclosure set forth herein may be practiced. Any aspect of the disclosure disclosed herein may be embodied by one or more elements of a claim.

Several aspects of telecommunication systems will now be presented with reference to various methods, operations, apparatuses, and techniques. These methods, operations, apparatuses, and techniques will be described in the following detailed description and illustrated in the accompanying drawings by various blocks, modules, components, circuits, steps, processes, or algorithms (collectively referred to as "elements"). These elements may be implemented using hardware, software, or a combination of hardware and software. Whether such elements are implemented as hardware or software depends upon the particular application and design constraints imposed on the overall system.

A wireless communication may be performed using a quadrature amplitude modulated (QAM) signal. A QAM signal may be associated with a set of constellation points that may be visualized as points in a two-dimensional plane (referred to as a constellation) with a first axis indicating an in-phase component of the constellation point and a second axis indicating a quadrature component of the constellation point. For example, the in-phase component and the quadrature component of a given constellation point may each be represented by one or more bits. In 16QAM, a component (such as the in-phase component or the quadrature component) may be represented by a first bit indicating a sign of the component and a second bit indicating an amplitude of the component. Higher-order QAM schemes may use more than one bit to indicate the amplitude of a component. Thus, a bit vector can be mapped to a corresponding constellation point (referred to as a symbol) and the symbol can be modulated onto a signal. A receiver can demodulate a sample of the signal, identify the constellation point/symbol, and thus identify the bit vector. Higher-order QAM schemes have a larger number of constellation points, meaning that higher-order QAM schemes can convey more information (larger bit vectors) than lower-order QAM schemes, but lower-order QAM schemes may be usable in less favorable channel conditions than higher-order QAM schemes.

In some wireless communication systems, the bits of a given communication are uniformly distributed in probability. For example, let X be the transmitted vector and Y be the received vector. At the transmitter, the bits coming out of the source are uniformly distributed ($P(X_i=0)=P(X_i=1)=0.5$). Hence, during modulation, an input bitstring being mapped onto any constellation point of the constellation is equally likely. That is, all the constellation points are transmitted with equal probability.

For higher-order modulation schemes, inner constellation points may consume lower energy or power as compared to outer constellation points. Hence, if inner constellation points are used more frequently than outer constellation points (that is, if constellation points are non-uniformly distributed in probability), energy consumption for a given transmission can be reduced. A bias toward lower-energy constellation points may be achieved by probabilistic shaping. Broadly speaking, "probabilistic shaping" may refer to manipulating input information that has a first probability distribution, to generate output information that has a second probability distribution. In the context of QAM communication, "probabilistic shaping" may refer to manipulating the likelihood of a given constellation point being used for a given set of bits or to manipulating the design of the constellation to achieve a desired outcome (e.g., energy consumption reduction, bias toward a lower-energy set of constellation points). For example, given input bitstrings or symbols with uniform probability distributions, a transmitter may apply a transformation to an input bitstring so that an output bitstring or symbol (for mapping to the constellation) has a non-uniform probability distribution.

One form of constellation shaping is probabilistic amplitude shaping (PAS). In PAS, uniformly distributed information (input) bits may be converted into non-uniformly distributed amplitude values of a QAM component (such as an in-phase component or a quadrature component). Thus, a probability that a given input bit set is mapped to a (for example) lower-energy constellation point can be increased. For example, a sequence of uniformly distributed (P(X=0)=P(X=1)=0.5) transmitted bits can be shaped into a new sequence of bits where the probability of zeroes becomes 70% (P(X=0)=0.7) and the probability of ones becomes 30% (P(X=1)=0.3).

Polar coding is a form of channel coding. In polar coding, a physical channel is divided into a number of virtual channels (generally referred to herein as or corresponding to "locations," "positions," or "bit positions"). Some of these locations tend toward high reliability and others of these locations tend toward low reliability, which is referred to as polarization. Information (such as data bits or symbols) may be mapped to high-reliability locations (referred to as "second locations" or "information locations"). A known or fixed or derivable value (such as a zero) may be mapped to low-reliability locations (referred to as "first locations," "frozen locations," or "frozen bit positions," since the values mapped to such bit positions are often predefined or "frozen"). A high-reliability location (also referred to as a higher-reliability location) may comprise a bit location with a reliability that satisfies a threshold. A low-reliability location (also referred to as a lower-reliability location) may comprise a bit location with a reliability that fails to satisfy the threshold. One form of polar coding is binary polar coding (BPC) in which each value mapped to a location is selected from one of two possible values. That is, in BPC, a finite field or Galois field has order 2 (q=2 or GF(2)). Another form of polar coding is non-binary polar coding (NBPC) in which each value mapped to a location is selected from more than two possible values. That is, in NBPC, a finite field or Galois field has an order greater than 2 (GF(q) where q>2).

A BPC may be used to perform PAS. For example, a BPC may be used to shape one or more bits of an amplitude component to bias modulation of bitstrings toward certain QAM constellation points (a sign bit is not shaped to retain symmetric constellation mapping across all four quadrants). PAS using a BPC may use a set of amplitude shaping values that define target probabilities for the one or more bits (or the corresponding QAM constellation point), and this set of amplitude shaping values may be defined or represented by a log likelihood ratio (LLR), which is a natural logarithm of a ratio of the likelihood of observing a given set of data (first value of one or more bits) under one hypothesis to the likelihood of observing the given set of data under another hypothesis (second value of the one or more bits). For lower-order modulation schemes (such as 16QAM), since there is only one amplitude bit to be shaped, PAS using BPC may provide a threshold performance. However, for higher-order modulation (64QAM, 256QAM, and so on), multiple amplitude bits may be shaped to improve the distribution of the constellation points. For shaping q amplitude bits, BPC uses q passes, since BPC shapes only one bit in a given pass. For example, for each of multiple BPC shaping passes, the shaping target distribution of pass q may be calculated using the outcome of the previous q−1 passes. For example, assuming 2-bit shaping (GF(2) i.e. {0, 1}) with a BPC shaper, during the second pass, the target probability of the second bit may be updated according to a desired target 2-bit symbol probability conditioned on the value of the first bit (obtained from result of the first shaping pass). This is cumbersome and scales poorly to higher-order modulation schemes. For example, performing q passes of BPC to shape q amplitude bits may use excess processing resources and introduce delay at a transmitter and a receiver.

Various aspects relate generally to PAS of QAM communications using NBPC. Some aspects more specifically provide procedures and configurations used to perform, at a transmitter, PAS of QAM communications using NBPC. NBPC differs from BPC in that BPC uses a binary-input channel whereas NBPC uses a non-binary input channel. For example, while BPC uses an LLR with a single value corresponding to a given bit $x_i$ to be shaped (that is, the given bit $x_i$ has GF(2)), NBPC may use a probability mass function (PMF), such as a log PMF (LPMF) to define or represent amplitude shaping target values. The LPMF, for a symbol $x_i$ with q possible values (that is, GF(q)), may provide a set of probability values indicating probabilities of $x_i$ being each of $\{0, 1, \alpha, \alpha^2 \ldots, \alpha^{q-2}\}$, where the probability values are associated with the amplitude shaping target values. The probability values may be associated with the amplitude shaping values in that the probability values are derived from the amplitude shaping values, as described below.

Furthermore, the transmitter may use a non-binary polar transform decoding operation, in connection with the LPMF (or other representation or definition of the set of probability values), to perform PAS. For example, the transmitter may perform a first non-binary polar transformation encoding operation on an input symbol vector. The input symbol vector may include a set of "unshaped" symbols which may be derived from bits of an input bit vector (e.g., data to be transmitted). Unlike traditional polar coding, the first non-binary polar transformation encoding operation may place symbols of the input symbol vector on first (e.g., low-reliability, frozen) locations and zeroes on second (e.g., high-reliability, information) locations, which facilitates shaping of probabilities of the symbols in accordance with the amplitude shaping target values. For example, the first non-binary polar transformation encoding operation may output a second symbol vector (including a set of transformed data symbols) which may be used to generate the LPMF for each symbol of the second symbol vector, as described elsewhere herein. At least part of the LPMF and the second symbol vector may be input to the non-binary polar decoding operation, and the non-binary polar decoding operation may output a third symbol vector s including a first set of shaping symbols.

The transmitter may perform a second non-binary polar transformation encoding operation on the third symbol vector, which may generate a fourth symbol vector. Notably, the fourth symbol vector includes a second set of shaping symbols that, when combined with the transformed data symbols of the second symbol vector (such as via a third polar transformation encoding operation), may provide a fifth symbol vector including a set of shaped symbols. For example, values of the set of shaped symbols may have a non-uniform probability distribution, whereas values of the set of the unshaped symbols of the input vector may have a uniform probability distribution.

In some examples, the LPMF may be associated with a normalization operation. For example, the transmitter may perform a normalization operation that reduces a size of the LPMF (such as one or more vectors representing the LPMF).

Particular aspects of the subject matter described in this disclosure can be implemented to realize one or more of the following potential advantages. In some examples, by performing PAS using NBPC, the described techniques can be used to reduce the number of passes to perform PAS relative to PAS using BPC. For example, PAS using NBPC can be performed in a single pass for an arbitrary number of bits, whereas PAS using BPC may require q passes to shape q amplitude bits. Thus, delay associated with PAS is reduced and processor usage is reduced. By using an LPMF associated with a normalization operation, hardware complexity is reduced relative to using an un-normalized LPMF. Furthermore, PAS using NBPC may provide (at the transmitter) biasing of modulation toward lower energy constellation points, which results in a lower transmission energy. At the receiver, forward error correction codes (FEC) with a higher code rate can be used since a shaping rate can be modified to adapt to different channel conditions. Furthermore, with higher code rate FEC, efficiency of a FEC decoder (such as the low-density parity check (LDPC) decoder used in the 5G standard) may be improved in terms of throughput or area because the FEC decoder hardware latency and area are often dominated by a minimum supported code rate. Also, at the receiver, a de-mapper can take advantage of the shaper target distribution (referred to herein as amplitude shaping target values) to improve performance.

Multiple-access radio access technologies (RATs) have been adopted in various telecommunication standards to provide common protocols that enable wireless communication devices to communicate on a municipal, enterprise, national, regional, or global level. For example, 5G New Radio (NR) is part of a continuous mobile broadband evolution promulgated by the Third Generation Partnership Project (3GPP). 5G NR supports various technologies and use cases including enhanced mobile broadband (eMBB), ultra-reliable low-latency communication (URLLC), massive machine-type communication (mMTC), millimeter wave (mmWave) technology, beamforming, network slicing, edge computing, Internet of Things (IoT) connectivity and management, and network function virtualization (NFV).

As the demand for broadband access increases and as technologies supported by wireless communication networks evolve, further technological improvements may be adopted in or implemented for 5G NR or future RATs, such as 6G, to further advance the evolution of wireless communication for a wide variety of existing and new use cases and applications. Such technological improvements may be associated with new frequency band expansion, licensed and unlicensed spectrum access, overlapping spectrum use, small cell deployments, non-terrestrial network (NTN) deployments, disaggregated network architectures and network topology expansion, device aggregation, advanced duplex communication, sidelink and other device-to-device direct communication, IoT (including passive or ambient IoT) networks, reduced capability (RedCap) UE functionality, industrial connectivity, multiple-subscriber implementations, high-precision positioning, radio frequency (RF) sensing, and/or artificial intelligence or machine learning (AI/ML), among other examples. These technological improvements may support use cases such as wireless backhauls, wireless data centers, extended reality (XR) and metaverse applications, meta services for supporting vehicle connectivity, holographic and mixed reality communication, autonomous and collaborative robots, vehicle platooning and cooperative maneuvering, sensing networks, gesture monitoring, human-brain interfacing, digital twin applications, asset management, and universal coverage applications using non-terrestrial and/or aerial platforms, among other examples. The methods, operations, apparatuses, and techniques described herein may enable one or more of the foregoing technologies and/or support one or more of the foregoing use cases.

FIG. 1 is a diagram illustrating an example of a wireless communication network 100 in accordance with the present disclosure. The wireless communication network 100 may be or may include elements of a 5G (or NR) network or a 6G network, among other examples. The wireless communication network 100 may include multiple network nodes 110, shown as a network node (NN) 110a, a network node 110b, a network node 110c, and a network node 110d. The network nodes 110 may support communications with multiple UEs 120, shown as a UE 120a, a UE 120b, a UE 120c, a UE 120d, and a UE 120e.

The network nodes 110 and the UEs 120 of the wireless communication network 100 may communicate using the electromagnetic spectrum, which may be subdivided by frequency or wavelength into various classes, bands, carriers, and/or channels. For example, devices of the wireless communication network 100 may communicate using one or more operating bands. In some aspects, multiple wireless communication networks 100 may be deployed in a given geographic area. Each wireless communication network 100 may support a particular RAT (which may also be referred to as an air interface) and may operate on one or more carrier frequencies in one or more frequency ranges. Examples of RATs include a 4G RAT, a 5G/NR RAT, and/or a 6G RAT, among other examples. In some examples, when multiple RATs are deployed in a given geographic area, each RAT in the geographic area may operate on different frequencies to avoid interference with one another.

Various operating bands have been defined as frequency range designations FR1 (410 MHz through 7.125 GHz), FR2 (24.25 GHz through 52.6 GHz), FR3 (7.125 GHz through 24.25 GHZ), FR4a or FR4-1 (52.6 GHz through 71 GHz), FR4 (52.6 GHz through 114.25 GHz), and FR5 (114.25 GHz through 300 GHz). Although a portion of FR1 is greater than 6 GHz, FR1 is often referred to (interchangeably) as a "Sub-6 GHz" band in some documents and articles. Similarly, FR2 is often referred to (interchangeably) as a "millimeter wave" band in some documents and articles, despite being different than the extremely high frequency (EHF) band (30 GHz through 300 GHz), which is identified by the International Telecommunications Union (ITU) as a "millimeter wave" band. The frequencies between FR1 and FR2 are often referred to as mid-band frequencies, which include FR3. Frequency bands falling within FR3 may inherit FR1 characteristics or FR2 characteristics, and thus may effectively extend features of FR1 or FR2 into mid-band frequencies. Thus, "sub-6 GHz," if used herein, may broadly refer to frequencies that are less than 6 GHZ, that are within FR1, and/or that are included in mid-band frequencies. Similarly, the term "millimeter wave," if used herein, may broadly refer to frequencies that are included in mid-band frequencies, that are within FR2, FR4, FR4-a or FR4-1, or FR5, and/or that are within the EHF band. Higher frequency bands may extend 5G NR operation, 6G operation, and/or other RATs beyond 52.6 GHz. For example, each of FR4a, FR4-1, FR4, and FR5 falls within the EHF band. In some examples, the wireless communication network 100 may implement dynamic spectrum sharing (DSS), in which multiple RATs (for example, 4G/LTE and 5G/NR) are implemented with dynamic bandwidth allocation (for example, based on user demand) in a single frequency band. It is contemplated that the frequencies included in these operating bands (for example, FR1, FR2, FR3, FR4, FR4-a, FR4-1, and/or FR5) may be modified, and techniques described herein may be applicable to those modified frequency ranges.

A network node 110 may include one or more devices, components, or systems that enable communication between a UE 120 and one or more devices, components, or systems of the wireless communication network 100. A network node 110 may be, may include, or may also be referred to as an NR network node, a 5G network node, a 6G network node, a Node B, an eNB, a gNB, an access point (AP), a transmission reception point (TRP), a mobility element, a core, a network entity, a network element, a network equipment, and/or another type of device, component, or system included in a radio access network (RAN).

A network node 110 may be implemented as a single physical node (for example, a single physical structure) or may be implemented as two or more physical nodes (for example, two or more distinct physical structures). For example, a network node 110 may be a device or system that implements part of a radio protocol stack, a device or system that implements a full radio protocol stack (such as a full gNB protocol stack), or a collection of devices or systems that collectively implement the full radio protocol stack. For example, and as shown, a network node 110 may be an aggregated network node (having an aggregated architecture), meaning that the network node 110 may implement a full radio protocol stack that is physically and logically integrated within a single node (for example, a single physical structure) in the wireless communication network 100. For example, an aggregated network node 110 may consist of a single standalone base station or a single TRP that uses a full radio protocol stack to enable or facilitate communication between a UE 120 and a core network of the wireless communication network 100.

Alternatively, and as also shown, a network node 110 may be a disaggregated network node (sometimes referred to as a disaggregated base station), meaning that the network node 110 may implement a radio protocol stack that is physically distributed and/or logically distributed among two or more nodes in the same geographic location or in different geographic locations. For example, a disaggregated network node may have a disaggregated architecture. In some deployments, disaggregated network nodes 110 may be used in an integrated access and backhaul (IAB) network, in an open radio access network (O-RAN) (such as a network configuration in compliance with the O-RAN Alliance), or in a virtualized radio access network (vRAN), also known as a cloud radio access network (C-RAN), to facilitate scaling by separating base station functionality into multiple units that can be individually deployed.

The network nodes 110 of the wireless communication network 100 may include one or more central units (CUs), one or more distributed units (DUs), and/or one or more radio units (RUs). A CU may host one or more higher layer control functions, such as radio resource control (RRC) functions, packet data convergence protocol (PDCP) functions, and/or service data adaptation protocol (SDAP) functions, among other examples. A DU may host one or more of a radio link control (RLC) layer, a medium access control (MAC) layer, and/or one or more higher physical (PHY) layers depending, at least in part, on a functional split, such as a functional split defined by the 3GPP. In some examples, a DU also may host one or more lower PHY layer functions, such as a fast Fourier transform (FFT), an inverse FFT (iFFT), beamforming, physical random access channel (PRACH) extraction and filtering, and/or scheduling of resources for one or more UEs 120, among other examples. An RU may host RF processing functions or lower PHY layer functions, such as an FFT, an iFFT, beamforming, or PRACH extraction and filtering, among other examples, according to a functional split, such as a lower layer functional split. In such an architecture, each RU can be operated to handle over the air (OTA) communication with one or more UEs 120.

In some aspects, a single network node 110 may include a combination of one or more CUs, one or more DUs, and/or one or more RUs. Additionally or alternatively, a network node 110 may include one or more Near-Real Time (Near-RT) RAN Intelligent Controllers (RICs) and/or one or more Non-Real Time (Non-RT) RICs. In some examples, a CU, a DU, and/or an RU may be implemented as a virtual unit, such as a virtual central unit (VCU), a virtual distributed unit (VDU), or a virtual radio unit (VRU), among other examples. A virtual unit may be implemented as a virtual network function, such as associated with a cloud deployment.

Some network nodes 110 (for example, a base station, an RU, or a TRP) may provide communication coverage for a particular geographic area. In the 3GPP, the term "cell" can refer to a coverage area of a network node 110 or to a network node 110 itself, depending on the context in which the term is used. A network node 110 may support one or multiple (for example, three) cells. In some examples, a network node 110 may provide communication coverage for a macro cell, a pico cell, a femto cell, or another type of cell. A macro cell may cover a relatively large geographic area (for example, several kilometers in radius) and may allow unrestricted access by UEs 120 with service subscriptions. A pico cell may cover a relatively small geographic area and may allow unrestricted access by UEs 120 with service subscriptions. A femto cell may cover a relatively small geographic area (for example, a home) and may allow restricted access by UEs 120 having association with the femto cell (for example, UEs 120 in a closed subscriber group (CSG)). A network node 110 for a macro cell may be referred to as a macro network node. A network node 110 for a pico cell may be referred to as a pico network node. A network node 110 for a femto cell may be referred to as a femto network node or an in-home network node. In some examples, a cell may not necessarily be stationary. For example, the geographic area of the cell may move according to the location of an associated mobile network node 110 (for example, a train, a satellite base station, an unmanned aerial vehicle, or an NTN network node).

The wireless communication network 100 may be a heterogeneous network that includes network nodes 110 of different types, such as macro network nodes, pico network nodes, femto network nodes, relay network nodes, aggregated network nodes, and/or disaggregated network nodes, among other examples. In the example shown in FIG. 1, the network node 110a may be a macro network node for a macro cell 130a, the network node 110b may be a pico network node for a pico cell 130b, and the network node 110c may be a femto network node for a femto cell 130c. Various different types of network nodes 110 may generally transmit at different power levels, serve different coverage areas, and/or have different impacts on interference in the wireless communication network 100 than other types of network nodes 110. For example, macro network nodes may have a high transmit power level (for example, 5 to 40 watts), whereas pico network nodes, femto network nodes, and relay network nodes may have lower transmit power levels (for example, 0.1 to 2 watts).

In some examples, a network node 110 may be, may include, or may operate as an RU, a TRP, or a base station that communicates with one or more UEs 120 via a radio access link (which may be referred to as a "Uu" link). The radio access link may include a downlink and an uplink. "Downlink" (or "DL") refers to a communication direction from a network node 110 to a UE 120, and "uplink" (or "UL") refers to a communication direction from a UE 120 to a network node 110. Downlink channels may include one or more control channels and one or more data channels. A downlink control channel may be used to transmit downlink control information (DCI) (for example, scheduling information, reference signals, and/or configuration information) from a network node 110 to a UE 120. A downlink data channel may be used to transmit downlink data (for example, user data associated with a UE 120) from a network node 110 to a UE 120. Downlink control channels may include one or more physical downlink control channels (PDCCHs), and downlink data channels may include one or more physical downlink shared channels (PDSCHs). Uplink channels may similarly include one or more control channels and one or more data channels. An uplink control channel may be used to transmit uplink control information (UCI) (for example, reference signals and/or feedback corresponding to one or more downlink transmissions) from a UE 120 to a network node 110. An uplink data channel may be used to transmit uplink data (for example, user data associated with a UE 120) from a UE 120 to a network node 110. Uplink control channels may include one or more physical uplink control channels (PUCCHs), and uplink data channels may include one or more physical uplink shared channels (PUSCHs). The downlink and the uplink may each include a set of resources on which the network node 110 and the UE 120 may communicate.

Downlink and uplink resources may include time domain resources (frames, subframes, slots, and/or symbols), frequency domain resources (frequency bands, component carriers, subcarriers, resource blocks, and/or resource elements), and/or spatial domain resources (particular transmit directions and/or beam parameters). Frequency domain resources of some bands may be subdivided into bandwidth parts (BWPs). A BWP may be a continuous block of frequency domain resources (for example, a continuous block of resource blocks) that are allocated for one or more UEs 120. A UE 120 may be configured with both an uplink BWP and a downlink BWP (where the uplink BWP and the downlink BWP may be the same BWP or different BWPs). A BWP may be dynamically configured (for example, by a network node 110 transmitting a DCI configuration to the one or more UEs 120) and/or reconfigured, which means that a BWP can be adjusted in real-time (or near-real-time) based on changing network conditions in the wireless communication network 100 and/or based on the specific requirements of the one or more UEs 120. This enables more efficient use of the available frequency domain resources in the wireless communication network 100 because fewer frequency domain resources may be allocated to a BWP for a UE 120 (which may reduce the quantity of frequency domain resources that a UE 120 is required to monitor), leaving more frequency domain resources to be spread across multiple UEs 120. Thus, BWPs may also assist in the implementation of lower-capability UEs 120 by facilitating the configuration of smaller bandwidths for communication by such UEs 120.

As described above, in some aspects, the wireless communication network 100 may be, may include, or may be included in, an IAB network. In an IAB network, at least one network node 110 is an anchor network node that communicates with a core network. An anchor network node 110 may also be referred to as an IAB donor (or "IAB-donor"). The anchor network node 110 may connect to the core network via a wired backhaul link. For example, an Ng interface of the anchor network node 110 may terminate at the core network. Additionally or alternatively, an anchor network node 110 may connect to one or more devices of the core network that provide a core access and mobility management function (AMF). An IAB network also generally includes multiple non-anchor network nodes 110, which may also be referred to as relay network nodes or simply as IAB nodes (or "IAB-nodes"). Each non-anchor network node 110 may communicate directly with the anchor network node 110 via a wireless backhaul link to access the core network, or may communicate indirectly with the anchor network node 110 via one or more other non-anchor network nodes 110 and associated wireless backhaul links that form a backhaul path to the core network. Some anchor network node 110 or other non-anchor network node 110 may also communicate directly with one or more UEs 120 via wireless access links that carry access traffic. In some examples, network resources for wireless communication (such as time resources, frequency resources, and/or spatial resources) may be shared between access links and backhaul links.

In some examples, any network node 110 that relays communications may be referred to as a relay network node, a relay station, or simply as a relay. A relay may receive a transmission of a communication from an upstream station (for example, another network node 110 or a UE 120) and transmit the communication to a downstream station (for example, a UE 120 or another network node 110). In this case, the wireless communication network 100 may include or be referred to as a "multi-hop network." In the example shown in FIG. 1, the network node 110*d* (for example, a relay network node) may communicate with the network node 110*a* (for example, a macro network node) and the UE 120*d* in order to facilitate communication between the network node 110*a* and the UE 120*d*. Additionally or alternatively, a UE 120 may be or may operate as a relay station that can relay transmissions to or from other UEs 120. A UE 120 that relays communications may be referred to as a UE relay or a relay UE, among other examples.

The UEs 120 may be physically dispersed throughout the wireless communication network 100, and each UE 120 may be stationary or mobile. A UE 120 may be, may include, or may be included in an access terminal, another terminal, a mobile station, or a subscriber unit. A UE 120 may be, include, or be coupled with a cellular phone (for example, a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device, a biometric device, a wearable device (for example, a smart watch, smart clothing, smart glasses, a smart wristband, and/or smart jewelry, such as a smart ring or a smart bracelet), an entertainment device (for example, a music device, a video device, and/or a satellite radio), an XR device, a vehicular component or sensor, a smart meter or sensor, industrial manufacturing equipment, a Global Navigation Satellite System (GNSS) device (such as a Global Positioning System device or another type of positioning device), a UE function of a network node, and/or any other suitable device or function that may communicate via a wireless medium.

A UE 120 and/or a network node 110 may include one or more chips, system-on-chips (SoCs), chipsets, packages, or devices that individually or collectively constitute or comprise a processing system. The processing system includes processor (or "processing") circuitry in the form of one or multiple processors, microprocessors, processing units (such as central processing units (CPUs), graphics processing units (GPUs), neural processing units (NPUs) and/or digital signal processors (DSPs)), processing blocks, application-specific integrated circuits (ASIC), programmable logic devices (PLDs) (such as field programmable gate arrays (FPGAs)), or other discrete gate or transistor logic or circuitry (all of which may be generally referred to herein individually as "processors" or collectively as "the processor" or "the processor circuitry"). One or more of the processors may be individually or collectively configurable or configured to perform various functions or operations described herein. A group of processors collectively configurable or configured to perform a set of functions may include a first processor configurable or configured to perform a first function of the set and a second processor configurable or configured to perform a second function of the set, or may include the group of processors all being configured or configurable to perform the set of functions.

The processing system may further include memory circuitry in the form of one or more memory devices, memory blocks, memory elements or other discrete gate or transistor logic or circuitry, each of which may include tangible storage media such as random-access memory (RAM) or read-only memory (ROM), or combinations thereof (all of which may be generally referred to herein individually as "memories" or collectively as "the memory" or "the memory circuitry"). One or more of the memories may be coupled (for example, operatively coupled, communicatively coupled, electronically coupled, or electrically coupled) with one or more of the processors and may individually or collectively store processor-executable code (such as software) that, when executed by one or more of the processors, may configure one or more of the processors to perform various functions or operations described herein. Additionally or alternatively, in some examples, one or more of the processors may be preconfigured to perform various functions or operations described herein without requiring configuration by software. The processing system may further include or be coupled with one or more modems (such as a Wi-Fi (for example, IEEE compliant) modem or a cellular (for example, 3GPP 4G LTE, 5G, or 6G compliant) modem). In some implementations, one or more processors of the processing system include or implement one or more of the modems. The processing system may further include or be coupled with multiple radios (collectively "the radio"), multiple RF chains, or multiple transceivers, each of which may in turn be coupled with one or more of multiple antennas. In some implementations, one or more processors of the processing system include or implement one or more of the radios, RF chains or transceivers. The UE 120 may include or may be included in a housing that houses components associated with the UE 120 including the processing system.

Some UEs 120 may be considered machine-type communication (MTC) UEs, evolved or enhanced machine-type communication (eMTC), UEs, further enhanced eMTC (feMTC) UEs, or enhanced feMTC (efeMTC) UEs, or further evolutions thereof, all of which may be simply referred to as "MTC UEs". An MTC UE may be, may include, or may be included in or coupled with a robot, an uncrewed aerial vehicle, a remote device, a sensor, a meter, a monitor, and/or a location tag. Some UEs 120 may be considered IoT devices and/or may be implemented as NB-IoT (narrowband IoT) devices. An IoT UE or NB-IoT device may be, may include, or may be included in or coupled with an industrial machine, an appliance, a refrigerator, a doorbell camera device, a home automation device, and/or a light fixture, among other examples. Some UEs 120 may be considered Customer Premises Equipment, which may include telecommunications devices that are installed at a customer location (such as a home or office) to enable access to a service provider's network (such as included in or in communication with the wireless communication network 100).

Some UEs 120 may be classified according to different categories in association with different complexities and/or different capabilities. UEs 120 in a first category may facilitate massive IoT in the wireless communication network 100, and may offer low complexity and/or cost relative to UEs 120 in a second category. UEs 120 in a second category may include mission-critical IoT devices, legacy UEs, baseline UEs, high-tier UEs, advanced UEs, full-capability UEs, and/or premium UEs that are capable of URLLC, enhanced mobile broadband (eMBB), and/or precise positioning in the wireless communication network 100, among other examples. A third category of UEs 120 may have mid-tier complexity and/or capability (for example, a capability between UEs 120 of the first category and UEs 120 of the second capability). A UE 120 of the third category may be referred to as a reduced capacity UE ("RedCap UE"), a mid-tier UE, an NR-Light UE, and/or an NR-Lite UE, among other examples. RedCap UEs may bridge a gap between the capability and complexity of NB-IoT devices and/or eMTC UEs, and mission-critical IoT devices and/or premium UEs. RedCap UEs may include, for example, wearable devices, IoT devices, industrial sensors, and/or cameras that are associated with a limited bandwidth, power capacity, and/or transmission range, among other examples. RedCap UEs may support healthcare environments, building automation, electrical distribution, process automation, transport and logistics, and/or smart city deployments, among other examples.

In some examples, two or more UEs 120 (for example, shown as UE 120a and UE 120e) may communicate directly with one another using sidelink communications (for example, without communicating by way of a network node 110 as an intermediary). As an example, the UE 120a may directly transmit data, control information, or other signaling as a sidelink communication to the UE 120e. This is in contrast to, for example, the UE 120a first transmitting data in an UL communication to a network node 110, which then transmits the data to the UE 120e in a DL communication. In various examples, the UEs 120 may transmit and receive sidelink communications using peer-to-peer (P2P) communication protocols, device-to-device (D2D) communication protocols, vehicle-to-everything (V2X) communication protocols (which may include vehicle-to-vehicle (V2V) protocols, vehicle-to-infrastructure (V2I) protocols, and/or vehicle-to-pedestrian (V2P) protocols), and/or mesh network communication protocols. In some deployments and configurations, a network node 110 may schedule and/or allocate resources for sidelink communications between UEs 120 in the wireless communication network 100. In some other deployments and configurations, a UE 120 (instead of a network node 110) may perform, or collaborate or negotiate with one or more other UEs to perform, scheduling operations, resource selection operations, and/or other operations for sidelink communications.

In various examples, some of the network nodes 110 and the UEs 120 of the wireless communication network 100 may be configured for full-duplex operation in addition to half-duplex operation. A network node 110 or a UE 120 operating in a half-duplex mode may perform only one of transmission or reception during particular time resources, such as during particular slots, symbols, or other time periods. Half-duplex operation may involve time-division duplexing (TDD), in which DL transmissions of the network node 110 and UL transmissions of the UE 120 do not occur in the same time resources (that is, the transmissions do not overlap in time). In contrast, a network node 110 or a UE 120 operating in a full-duplex mode can transmit and receive communications concurrently (for example, in the same time resources). By operating in a full-duplex mode, network nodes 110 and/or UEs 120 may generally increase the capacity of the network and the radio access link. In some examples, full-duplex operation may involve frequency-division duplexing (FDD), in which DL transmissions of the network node 110 are performed in a first frequency band or on a first component carrier and transmissions of the UE 120 are performed in a second frequency band or on a second component carrier different than the first frequency band or the first component carrier, respectively. In some examples, full-duplex operation may be enabled for a UE 120 but not for a network node 110. For example, a UE 120 may simultaneously transmit an UL transmission to a first network node 110 and receive a DL transmission from a second network node 110 in the same time resources. In some other examples, full-duplex operation may be enabled for a network node 110 but not for a UE 120. For example, a network node 110 may simultaneously transmit a DL transmission to a first UE 120 and receive an UL transmission from a second UE 120 in the same time resources. In some other examples, full-duplex operation may be enabled for both a network node 110 and a UE 120.

In some examples, the UEs 120 and the network nodes 110 may perform MIMO communication. "MIMO" generally refers to transmitting or receiving multiple signals (such as multiple layers or multiple data streams) simultaneously over the same time and frequency resources. MIMO techniques generally exploit multipath propagation. MIMO may be implemented using various spatial processing or spatial multiplexing operations. In some examples, MIMO may support simultaneous transmission to multiple receivers, referred to as multi-user MIMO (MU-MIMO). Some RATs may employ advanced MIMO techniques, such as mTRP operation (including redundant transmission or reception on multiple TRPs), reciprocity in the time domain or the frequency domain, single-frequency-network (SFN) transmission, or non-coherent joint transmission (NC-JT).

In some aspects, the transmitter may include a communication manager 140 or a communication manager 150. As described in more detail elsewhere herein, the communication manager 140 or the communication manager 150 may perform a first non-binary polar transformation encoding operation on a first symbol vector, including a set of data symbols, that generates a second symbol vector including a set of transformed data symbols, the set of data symbols being associated with first locations associated with the first non-binary polar transformation; perform a non-binary polar transformation decoding operation on the second symbol vector, in accordance with a set of probability values associated with a set of amplitude shaping target values, that generates a third symbol vector including a first set of shaping symbols; perform a second non-binary polar transformation encoding operation on the third symbol vector that generates a fourth symbol vector including a second set of shaping symbols, the second set of shaping symbols being associated with second locations associated with the second non-binary polar transformation encoding operation; and transmit a signal that is modulated in accordance with a fifth symbol vector including a set of shaped symbols associated with a combination of the second symbol vector and the fourth symbol vector. Additionally, or alternatively, the communication manager 140 or 150 may perform one or more other operations described herein.

Figure 2:
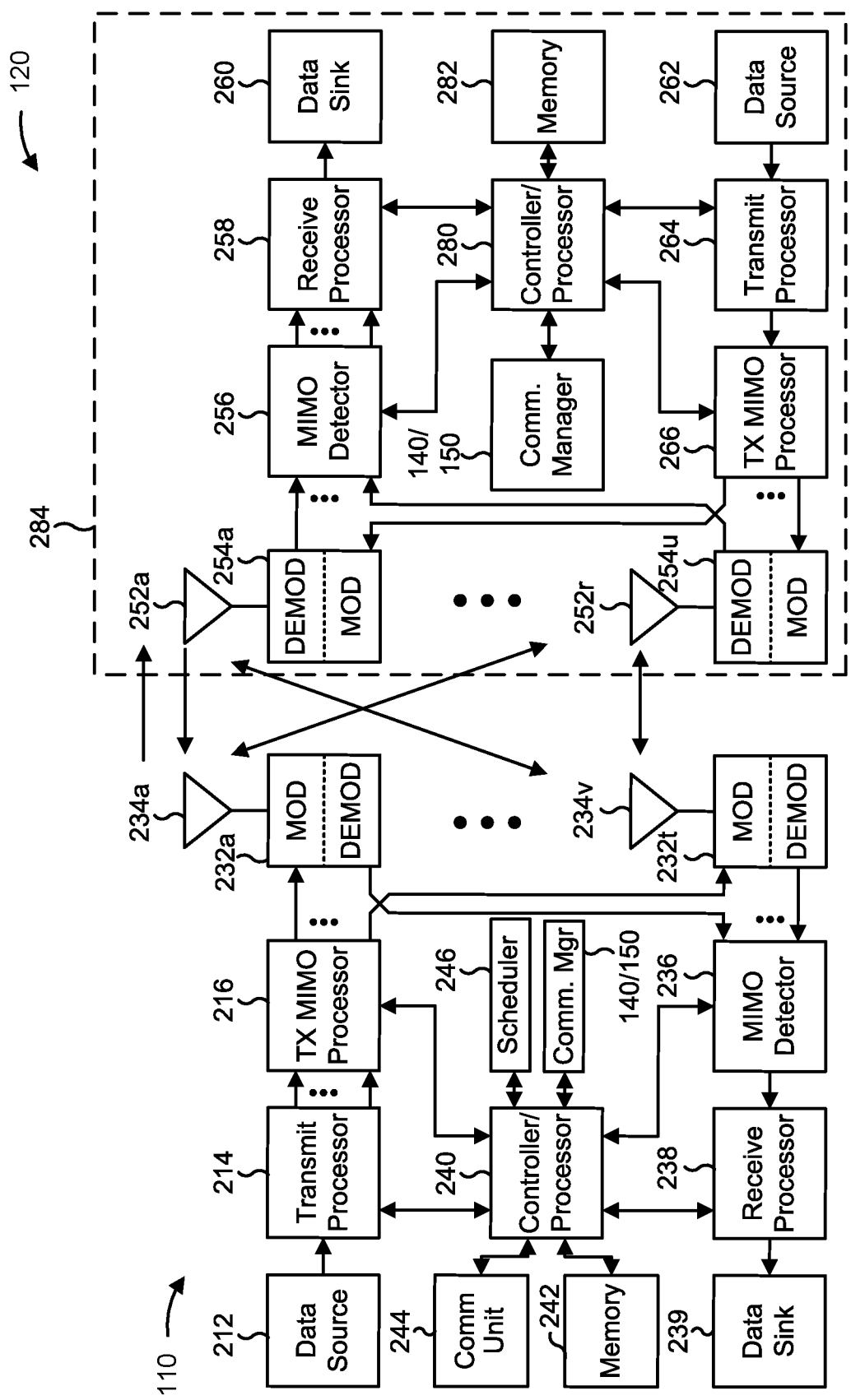
FIG. 2 is a diagram illustrating an example network node in communication with an example user equipment (UE) in a wireless network in accordance with the present disclosure.

FIG. 2 is a diagram illustrating an example network node 110 in communication with an example UE 120 in a wireless network in accordance with the present disclosure.

As shown in FIG. 2, the network node 110 may include a data source 212, a transmit processor 214, a transmit (TX) MIMO processor 216, a set of modems 232 (shown as 232a through 232t, where t≥1), a set of antennas 234 (shown as 234a through 234v, where v≥1), a MIMO detector 236, a receive processor 238, a data sink 239, a controller/processor 240, a memory 242, a communication unit 244, a scheduler 246, and/or a communication manager 150, among other examples. In some configurations, one or a combination of the antenna(s) 234, the modem(s) 232, the MIMO detector 236, the receive processor 238, the transmit processor 214, and/or the TX MIMO processor 216 may be included in a transceiver of the network node 110. The transceiver may be under control of and used by one or more processors, such as the controller/processor 240, and in some aspects in conjunction with processor-readable code stored in the memory 242, to perform aspects of the methods, processes, and/or operations described herein. In some aspects, the network node 110 may include one or more interfaces, communication components, and/or other components that facilitate communication with the UE 120 or another network node.

The terms "processor," "controller," or "controller/processor" may refer to one or more controllers and/or one or more processors. For example, reference to "a/the processor," "a/the controller/processor," or the like (in the singular) should be understood to refer to any one or more of the processors described in connection with FIG. 2, such as a single processor or a combination of multiple different processors. Reference to "one or more processors" should be understood to refer to any one or more of the processors described in connection with FIG. 2. For example, one or more processors of the network node 110 may include transmit processor 214, TX MIMO processor 216, MIMO detector 236, receive processor 238, and/or controller/processor 240. Similarly, one or more processors of the UE 120 may include MIMO detector 256, receive processor 258, transmit processor 264, TX MIMO processor 266, and/or controller/processor 280.

In some aspects, a single processor may perform all of the operations described as being performed by the one or more processors. In some aspects, a first set of (one or more) processors of the one or more processors may perform a first operation described as being performed by the one or more processors, and a second set of (one or more) processors of the one or more processors may perform a second operation described as being performed by the one or more processors. The first set of processors and the second set of processors may be the same set of processors or may be different sets of processors. Reference to "one or more memories" should be understood to refer to any one or more memories of a corresponding device, such as the memory described in connection with FIG. 2. For example, operation described as being performed by one or more memories can be performed by the same subset of the one or more memories or different subsets of the one or more memories.)

For downlink communication from the network node 110 to the UE 120, the transmit processor 214 may receive data ("downlink data") intended for the UE 120 (or a set of UEs that includes the UE 120) from the data source 212 (such as a data pipeline or a data queue). In some examples, the transmit processor 214 may select one or more MCSs for the UE 120 in accordance with one or more channel quality indicators (CQIs) received from the UE 120. The network node 110 may process the data (for example, including encoding the data) for transmission to the UE 120 on a downlink in accordance with the MCS(s) selected for the UE 120 to generate data symbols. The transmit processor 214 may process system information (for example, semi-static resource partitioning information (SRPI)) and/or control information (for example, CQI requests, grants, and/or upper layer signaling) and provide overhead symbols and/or control symbols. The transmit processor 214 may generate reference symbols for reference signals (for example, a cell-specific reference signal (CRS), a demodulation reference signal (DMRS), or a channel state information (CSI) reference signal (CSI-RS)) and/or synchronization signals (for example, a primary synchronization signal (PSS) or a secondary synchronization signals (SSS)).

The TX MIMO processor 216 may perform spatial processing (for example, precoding) on the data symbols, the control symbols, the overhead symbols, and/or the reference symbols, if applicable, and may provide a set of output symbol streams (for example, T output symbol streams) to the set of modems 232. For example, each output symbol stream may be provided to a respective modulator component (shown as MOD) of a modem 232. Each modem 232 may use the respective modulator component to process (for example, to modulate) a respective output symbol stream (for example, for orthogonal frequency division multiplexing ((OFDM)) to obtain an output sample stream. Each modem 232 may further use the respective modulator component to process (for example, convert to analog, amplify, filter, and/or upconvert) the output sample stream to obtain a time domain downlink signal. The modems 232a through 232t may together transmit a set of downlink signals (for example, T downlink signals) via the corresponding set of antennas 234.

A downlink signal may include a DCI communication, a MAC control element (MAC-CE) communication, an RRC communication, a downlink reference signal, or another type of downlink communication. Downlink signals may be transmitted on a PDCCH, a PDSCH, and/or on another downlink channel. A downlink signal may carry one or more transport blocks (TBs) of data. A TB may be a unit of data that is transmitted over an air interface in the wireless communication network 100. A data stream (for example, from the data source 212) may be encoded into multiple TBs for transmission over the air interface. The quantity of TBs used to carry the data associated with a particular data stream may be associated with a TB size common to the multiple TBs. The TB size may be based on or otherwise associated with radio channel conditions of the air interface, the MCS used for encoding the data, the downlink resources allocated for transmitting the data, and/or another parameter. In general, the larger the TB size, the greater the amount of data that can be transmitted in a single transmission, which reduces signaling overhead. However, larger TB sizes may be more prone to transmission and/or reception errors than smaller TB sizes, but such errors may be mitigated by more robust error correction techniques.

For uplink communication from the UE 120 to the network node 110, uplink signals from the UE 120 may be received by an antenna 234, may be processed by a modem 232 (for example, a demodulator component, shown as DEMOD, of a modem 232), may be detected by the MIMO detector 236 (for example, a receive (Rx) MIMO processor) if applicable, and/or may be further processed by the receive processor 238 to obtain decoded data and/or control information. The receive processor 238 may provide the decoded data to a data sink 239 (which may be a data pipeline, a data queue, and/or another type of data sink) and provide the decoded control information to a processor, such as the controller/processor 240.

The network node 110 may use the scheduler 246 to schedule one or more UEs 120 for downlink or uplink communications. In some aspects, the scheduler 246 may use DCI to dynamically schedule DL transmissions to the UE 120 and/or UL transmissions from the UE 120. In some examples, the scheduler 246 may allocate recurring time domain resources and/or frequency domain resources that the UE 120 may use to transmit and/or receive communications using an RRC configuration (for example, a semi-static configuration), for example, to perform semi-persistent scheduling (SPS) or to configure a configured grant (CG) for the UE 120.

One or more of the transmit processor 214, the TX MIMO processor 216, the modem 232, the antenna 234, the MIMO detector 236, the receive processor 238, and/or the controller/processor 240 may be included in an RF chain of the network node 110. An RF chain may include one or more filters, mixers, oscillators, amplifiers, analog-to-digital converters (ADCs), and/or other devices that convert between an analog signal (such as for transmission or reception via an air interface) and a digital signal (such as for processing by one or more processors of the network node 110). In some aspects, the RF chain may be or may be included in a transceiver of the network node 110.

In some examples, the network node 110 may use the communication unit 244 to communicate with a core network and/or with other network nodes. The communication unit 244 may support wired and/or wireless communication protocols and/or connections, such as Ethernet, optical fiber, common public radio interface (CPRI), and/or a wired or wireless backhaul, among other examples. The network node 110 may use the communication unit 244 to transmit and/or receive data associated with the UE 120 or to perform network control signaling, among other examples. The communication unit 244 may include a transceiver and/or an interface, such as a network interface.

The UE 120 may include a set of antennas 252 (shown as antennas 252a through 252r, where r≥1), a set of modems 254 (shown as modems 254a through 254u, where u≥1), a MIMO detector 256, a receive processor 258, a data sink 260, a data source 262, a transmit processor 264, a TX MIMO processor 266, a controller/processor 280, a memory 282, and/or a communication manager 140, among other examples. One or more of the components of the UE 120 may be included in a housing 284. In some aspects, one or a combination of the antenna(s) 252, the modem(s) 254, the MIMO detector 256, the receive processor 258, the transmit processor 264, or the TX MIMO processor 266 may be included in a transceiver that is included in the UE 120. The transceiver may be under control of and used by one or more processors, such as the controller/processor 280, and in some aspects in conjunction with processor-readable code stored in the memory 282, to perform aspects of the methods, processes, or operations described herein. In some aspects, the UE 120 may include another interface, another communication component, and/or another component that facilitates communication with the network node 110 and/or another UE 120.

For downlink communication from the network node 110 to the UE 120, the set of antennas 252 may receive the downlink communications or signals from the network node 110 and may provide a set of received downlink signals (for example, R received signals) to the set of modems 254. For example, each received signal may be provided to a respective demodulator component (shown as DEMOD) of a modem 254. Each modem 254 may use the respective demodulator component to condition (for example, filter, amplify, downconvert, and/or digitize) a received signal to obtain input samples. Each modem 254 may use the respective demodulator component to further demodulate or process the input samples (for example, for OFDM) to obtain received symbols. The MIMO detector 256 may obtain received symbols from the set of modems 254, may perform MIMO detection on the received symbols if applicable, and may provide detected symbols. The receive processor 258 may process (for example, decode) the detected symbols, may provide decoded data for the UE 120 to the data sink 260 (which may include a data pipeline, a data queue, and/or an application executed on the UE 120), and may provide decoded control information and system information to the controller/processor 280.

For uplink communication from the UE 120 to the network node 110, the transmit processor 264 may receive and process data ("uplink data") from a data source 262 (such as a data pipeline, a data queue, and/or an application executed on the UE 120) and control information from the controller/processor 280. The control information may include one or more parameters, feedback, one or more signal measurements, and/or other types of control information. In some aspects, the receive processor 258 and/or the controller/processor 280 may determine, for a received signal (such as received from the network node 110 or another UE), one or more parameters relating to transmission of the uplink communication. The one or more parameters may include a reference signal received power (RSRP) parameter, a received signal strength indicator (RSSI) parameter, a reference signal received quality (RSRQ) parameter, a CQI parameter, or a transmit power control (TPC) parameter, among other examples. The control information may include an indication of the RSRP parameter, the RSSI parameter, the RSRQ parameter, the CQI parameter, the TPC parameter, and/or another parameter. The control information may facilitate parameter selection and/or scheduling for the UE 120 by the network node 110.

The transmit processor 264 may generate reference symbols for one or more reference signals, such as an uplink DMRS, an uplink sounding reference signal (SRS), and/or another type of reference signal. The symbols from the transmit processor 264 may be precoded by the TX MIMO processor 266, if applicable, and further processed by the set of modems 254 (for example, for DFT-s-OFDM or CP-OFDM). The TX MIMO processor 266 may perform spatial processing (for example, precoding) on the data symbols, the control symbols, the overhead symbols, and/or the reference symbols, if applicable, and may provide a set of output symbol streams (for example, U output symbol streams) to the set of modems 254. For example, each output symbol stream may be provided to a respective modulator component (shown as MOD) of a modem 254. Each modem 254 may use the respective modulator component to process (for example, to modulate) a respective output symbol stream (for example, for OFDM) to obtain an output sample stream. Each modem 254 may further use the respective modulator component to process (for example, convert to analog, amplify, filter, and/or upconvert) the output sample stream to obtain an uplink signal.

The modems 254a through 254u may transmit a set of uplink signals (for example, R uplink signals or U uplink symbols) via the corresponding set of antennas 252. An uplink signal may include a UCI communication, a MAC-CE communication, an RRC communication, or another type of uplink communication. Uplink signals may be transmitted on a PUSCH, a PUCCH, and/or another type of uplink channel. An uplink signal may carry one or more TBs of data. Sidelink data and control transmissions (that is, transmissions directly between two or more UEs 120) may generally use similar techniques as were described for uplink data and control transmission, and may use sidelink-specific channels such as a physical sidelink shared channel (PSSCH), a physical sidelink control channel (PSCCH), and/or a physical sidelink feedback channel (PSFCH).

One or more antennas of the set of antennas 252 or the set of antennas 234 may include, or may be included within, one or more antenna panels, one or more antenna groups, one or more sets of antenna elements, or one or more antenna arrays, among other examples. An antenna panel, an antenna group, a set of antenna elements, or an antenna array may include one or more antenna elements (within a single housing or multiple housings), a set of coplanar antenna elements, a set of non-coplanar antenna elements, or one or more antenna elements coupled with one or more transmission or reception components, such as one or more components of FIG. 2. As used herein, "antenna" can refer to one or more antennas, one or more antenna panels, one or more antenna groups, one or more sets of antenna elements, or one or more antenna arrays. "Antenna panel" can refer to a group of antennas (such as antenna elements) arranged in an array or panel, which may facilitate beamforming by manipulating parameters of the group of antennas. "Antenna module" may refer to circuitry including one or more antennas, which may also include one or more other components (such as filters, amplifiers, or processors) associated with integrating the antenna module into a wireless communication device.

In some examples, each of the antenna elements of an antenna 234 or an antenna 252 may include one or more sub-elements for radiating or receiving radio frequency signals. For example, a single antenna element may include a first sub-element cross-polarized with a second sub-element that can be used to independently transmit cross-polarized signals. The antenna elements may include patch antennas, dipole antennas, and/or other types of antennas arranged in a linear pattern, a two-dimensional pattern, or another pattern. A spacing between antenna elements may be such that signals with a desired wavelength transmitted separately by the antenna elements may interact or interfere constructively and destructively along various directions (such as to form a desired beam). For example, given an expected range of wavelengths or frequencies, the spacing may provide a quarter wavelength, a half wavelength, or another fraction of a wavelength of spacing between neighboring antenna elements to allow for the desired constructive and destructive interference patterns of signals transmitted by the separate antenna elements within that expected range.

The amplitudes and/or phases of signals transmitted via antenna elements and/or sub-elements may be modulated and shifted relative to each other (such as by manipulating phase shift, phase offset, and/or amplitude) to generate one or more beams, which is referred to as beamforming. The term "beam" may refer to a directional transmission of a wireless signal toward a receiving device or otherwise in a desired direction. "Beam" may also generally refer to a direction associated with such a directional signal transmission, a set of directional resources associated with the signal transmission (for example, an angle of arrival, a horizontal direction, and/or a vertical direction), and/or a set of parameters that indicate one or more aspects of a directional signal, a direction associated with the signal, and/or a set of directional resources associated with the signal. In some implementations, antenna elements may be individually selected or deselected for directional transmission of a signal (or signals) by controlling amplitudes of one or more corresponding amplifiers and/or phases of the signal(s) to form one or more beams. The shape of a beam (such as the amplitude, width, and/or presence of side lobes) and/or the direction of a beam (such as an angle of the beam relative to a surface of an antenna array) can be dynamically controlled by modifying the phase shifts, phase offsets, and/or amplitudes of the multiple signals relative to each other.

Different UEs 120 or network nodes 110 may include different numbers of antenna elements. For example, a UE 120 may include a single antenna element, two antenna elements, four antenna elements, eight antenna elements, or a different number of antenna elements. As another example, a network node 110 may include eight antenna elements, 24 antenna elements, 64 antenna elements, 128 antenna elements, or a different number of antenna elements. Generally, a larger number of antenna elements may provide increased control over parameters for beam generation relative to a smaller number of antenna elements, whereas a smaller number of antenna elements may be less complex to implement and may use less power than a larger number of antenna elements. Multiple antenna elements may support multiple-layer transmission, in which a first layer of a communication (which may include a first data stream) and a second layer of a communication (which may include a second data stream) are transmitted using the same time and frequency resources with spatial multiplexing.

Figure 3:
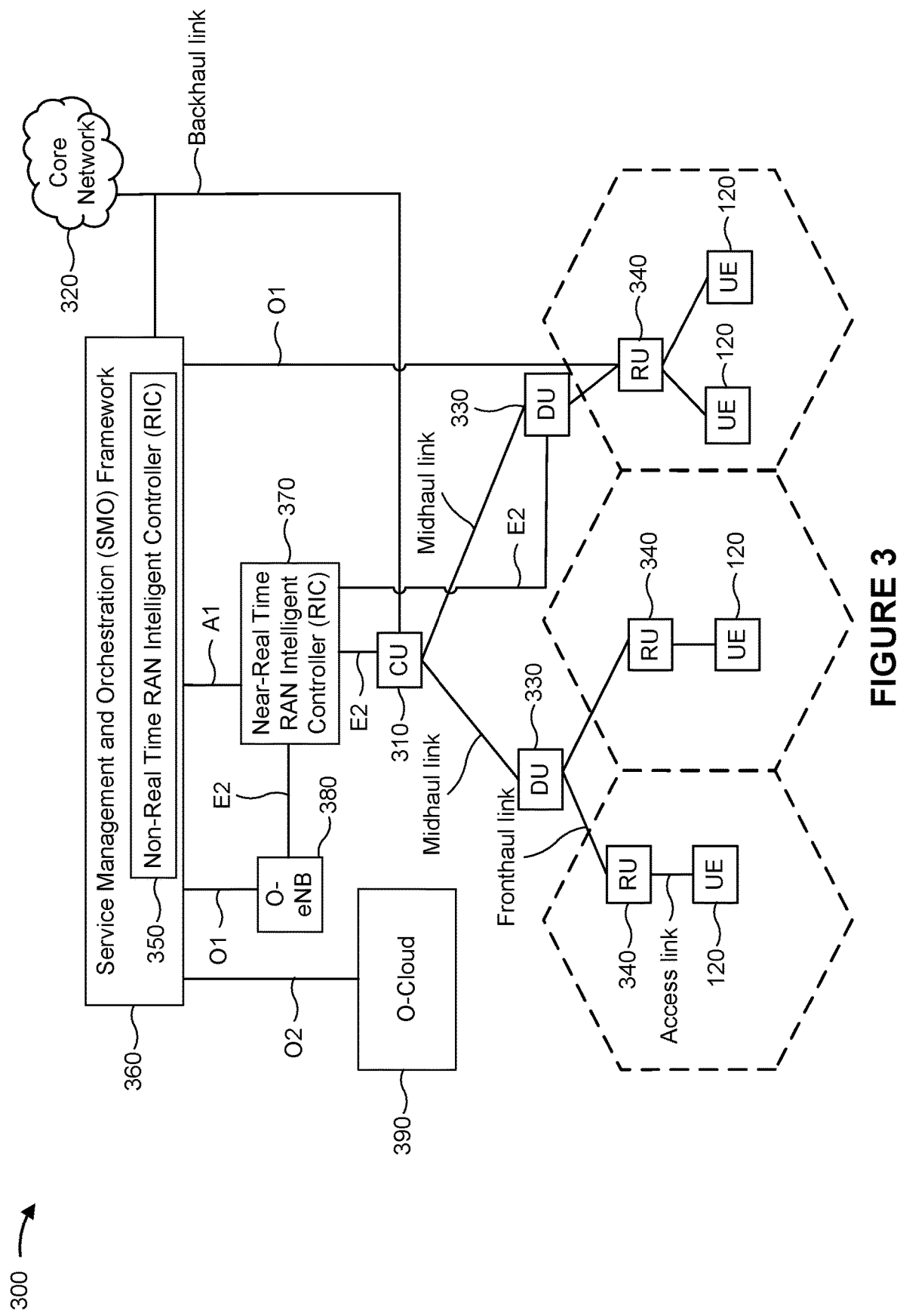
FIG. 3 is a diagram illustrating an example disaggregated base station architecture in accordance with the present disclosure.

FIG. 3 is a diagram illustrating an example disaggregated base station architecture 300 in accordance with the present disclosure. One or more components of the example disaggregated base station architecture 300 may be, may include, or may be included in one or more network nodes (such one or more network nodes 110). The disaggregated base station architecture 300 may include a CU 310 that can communicate directly with a core network 320 via a backhaul link, or that can communicate indirectly with the core network 320 via one or more disaggregated control units, such as a Non-RT RIC 350 associated with a Service Management and Orchestration (SMO) Framework 360 and/or a Near-RT RIC 370 (for example, via an E2 link). The CU 310 may communicate with one or more DUs 330 via respective midhaul links, such as via F1 interfaces. Each of the DUs 330 may communicate with one or more RUs 340 via respective fronthaul links. Each of the RUs 340 may communicate with one or more UEs 120 via respective RF access links. In some deployments, a UE 120 may be simultaneously served by multiple RUs 340.

Each of the components of the disaggregated base station architecture 300, including the CUs 310, the DUs 330, the RUs 340, the Near-RT RICs 370, the Non-RT RICs 350, and the SMO Framework 360, may include one or more interfaces or may be coupled with one or more interfaces for receiving or transmitting signals, such as data or information, via a wired or wireless transmission medium.

In some aspects, the CU 310 may be logically split into one or more CU user plane (CU-UP) units and one or more CU control plane (CU-CP) units. A CU-UP unit may communicate bidirectionally with a CU-CP unit via an interface, such as the E1 interface when implemented in an O-RAN configuration. The CU 310 may be deployed to communicate with one or more DUs 330, as necessary, for network control and signaling. Each DU 330 may correspond to a logical unit that includes one or more base station functions to control the operation of one or more RUs 340. For example, a DU 330 may host various layers, such as an RLC layer, a MAC layer, or one or more PHY layers, such as one or more high PHY layers or one or more low PHY layers. Each layer (which also may be referred to as a module) may be implemented with an interface for communicating signals with other layers (and modules) hosted by the DU 330, or for communicating signals with the control functions hosted by the CU 310. Each RU 340 may implement lower layer functionality. In some aspects, real-time and non-real-time aspects of control and user plane communication with the RU(s) 340 may be controlled by the corresponding DU 330.

The SMO Framework 360 may support RAN deployment and provisioning of non-virtualized and virtualized network elements. For non-virtualized network elements, the SMO Framework 360 may support the deployment of dedicated physical resources for RAN coverage requirements, which may be managed via an operations and maintenance interface, such as an O1 interface. For virtualized network elements, the SMO Framework 360 may interact with a cloud computing platform (such as an open cloud (O-Cloud) platform 390) to perform network element life cycle management (such as to instantiate virtualized network elements) via a cloud computing platform interface, such as an O2 interface. A virtualized network element may include, but is not limited to, a CU 310, a DU 330, an RU 340, a non-RT RIC 350, and/or a Near-RT RIC 370. In some aspects, the SMO Framework 360 may communicate with a hardware aspect of a 4G RAN, a 5G NR RAN, and/or a 6G RAN, such as an open eNB (O-eNB) 380, via an O1 interface. Additionally or alternatively, the SMO Framework 360 may communicate directly with each of one or more RUs 340 via a respective O1 interface. In some deployments, this configuration can enable each DU 330 and the CU 310 to be implemented in a cloud-based RAN architecture, such as a vRAN architecture.

The Non-RT RIC 350 may include or may implement a logical function that enables non-real-time control and optimization of RAN elements and resources, AI/ML workflows including model training and updates, and/or policy-based guidance of applications and/or features in the Near-RT RIC 370. The Non-RT RIC 350 may be coupled to or may communicate with (such as via an A1 interface) the Near-RT RIC 370. The Near-RT RIC 370 may include or may implement a logical function that enables near-real-time control and optimization of RAN elements and resources via data collection and actions via an interface (such as via an E2 interface) connecting one or more CUs 310, one or more DUs 330, and/or an O-eNB with the Near-RT RIC 370.

In some aspects, to generate AI/ML models to be deployed in the Near-RT RIC 370, the Non-RT RIC 350 may receive parameters or external enrichment information from external servers. Such information may be utilized by the Near-RT RIC 370 and may be received at the SMO Framework 360 or the Non-RT RIC 350 from non-network data sources or from network functions. In some examples, the Non-RT RIC 350 or the Near-RT RIC 370 may tune RAN behavior or performance. For example, the Non-RT RIC 350 may monitor long-term trends and patterns for performance and may employ AI/ML models to perform corrective actions via the SMO Framework 360 (such as reconfiguration via an O1 interface) or via creation of RAN management policies (such as A1 interface policies).

The network node 110, the controller/processor 240 of the network node 110, the UE 120, the controller/processor 280 of the UE 120, the CU 310, the DU 330, the RU 340, or any other component(s) of FIG. 1, 2, or 3 may implement one or more techniques or perform one or more operations associated with PAS using NBPC, as described in more detail elsewhere herein. For example, the controller/processor 240 of the network node 110, the controller/processor 280 of the UE 120, any other component(s) of FIG. 2, the CU 310, the DU 330, or the RU 340 may perform or direct operations of, for example, process 800 of FIG. 8, process 1000 of FIG. 10, or other processes as described herein (alone or in conjunction with one or more other processors). The memory 242 may store data and program codes for the network node 110, the network node 110, the CU 310, the DU 330, or the RU 340. The memory 282 may store data and program codes for the UE 120. In some examples, the memory 242 or the memory 282 may include a non-transitory computer-readable medium storing a set of instructions (for example, code or program code) for wireless communication. The memory 242 may include one or more memories, such as a single memory or multiple different memories (of the same type or of different types). The memory 282 may include one or more memories, such as a single memory or multiple different memories (of the same type or of different types). For example, the set of instructions, when executed (for example, directly, or after compiling, converting, or interpreting) by one or more processors of the network node 110, the UE 120, the CU 310, the DU 330, or the RU 340, may cause the one or more processors to perform process 800 of FIG. 8, process 1000 of FIG. 10, or other processes as described herein. In some examples, executing instructions may include running the instructions, converting the instructions, compiling the instructions, and/or interpreting the instructions, among other examples.

In some aspects, a transmitter, such as network node 110 or UE 120, includes means for performing a first non-binary polar transformation encoding operation on a first symbol vector, including a set of data symbols, that generates a second symbol vector including a set of transformed data symbols, the set of data symbols being associated with first locations associated with the first non-binary polar transformation; means for performing a non-binary polar transformation decoding operation on the second symbol vector, in accordance with a set of probability values associated with a set of amplitude shaping target values, that generates a third symbol vector including a first set of shaping symbols; means for performing a second non-binary polar transformation encoding operation on the third symbol vector that generates a fourth symbol vector including a second set of shaping symbols, the second set of shaping symbols being associated with second locations associated with the second non-binary polar transformation encoding operation; and/or means for transmitting a signal that is modulated in accordance with a fifth symbol vector including a set of shaped symbols associated with a combination of the second symbol vector and the fourth symbol vector. In some aspects, the means for the transmitter to perform operations described herein may include, for example, one or more of communication manager 150, transmit processor 214, TX MIMO processor 216, modem 232, antenna 234, MIMO detector 236, receive processor 238, controller/processor 240, memory 242, or scheduler 246. In some aspects, the means for the transmitter to perform operations described herein may include, for example, one or more of communication manager 140, antenna 252, modem 254, MIMO detector 256, receive processor 258, transmit processor 264, TX MIMO processor 266, controller/processor 280, or memory 282.

Figure 4:
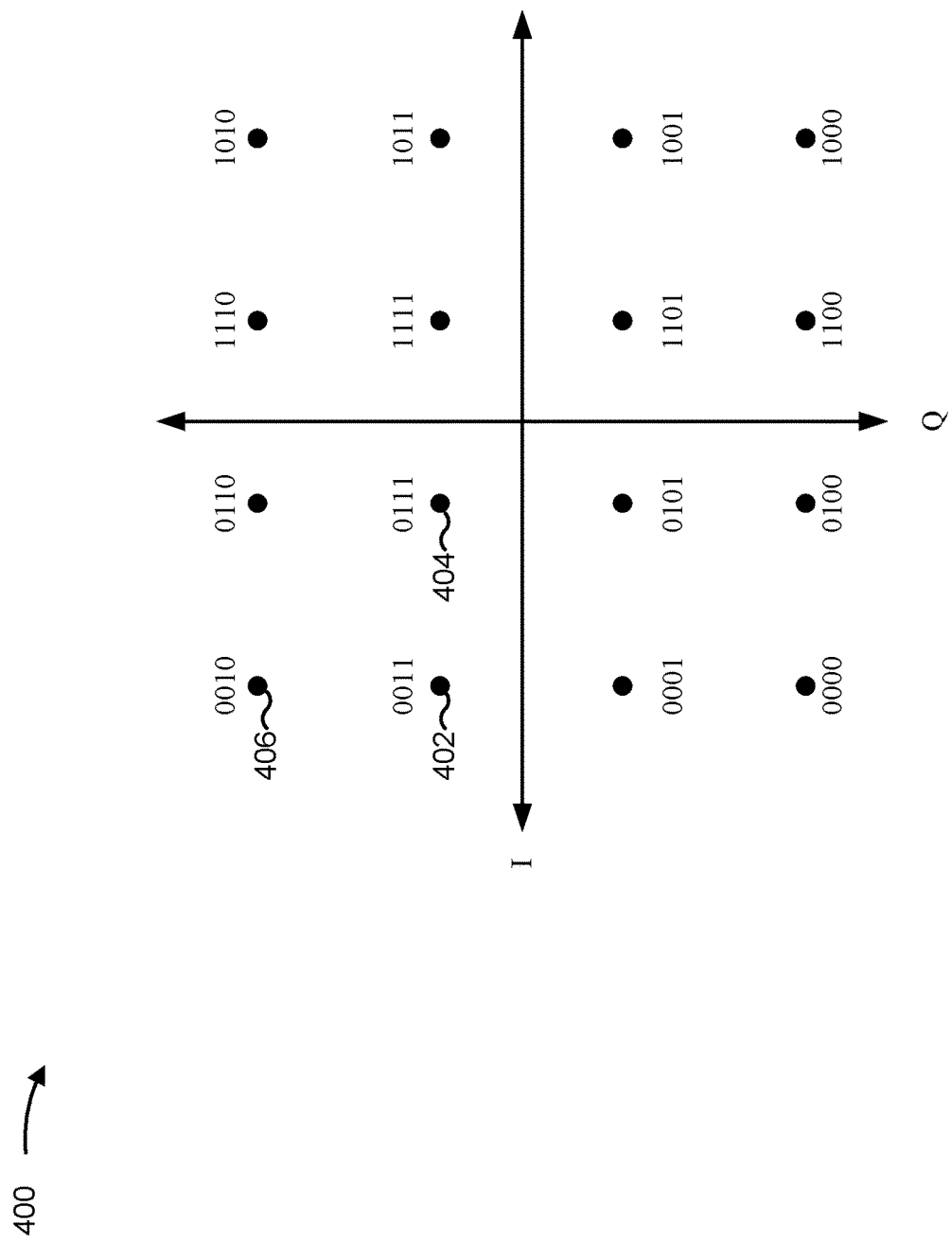
FIG. 4 is a diagram illustrating an example of symbol constellation diagrams, in accordance with the present disclosure.

FIG. 4 is a diagram illustrating an example 400 of symbol constellation diagrams, in accordance with the present disclosure. A constellation diagram is a representation of a signal modulated by a digital modulation scheme, such as quadrature amplitude modulation (QAM) (such as 16QAM, 64QAM, 256QAM, or the like). A constellation diagram illustrates a signal as a two-dimensional scatter diagram with an x axis (e.g., a horizontal real axis representing an in-phase carrier, shown as an I component) and a y axis (e.g., a vertical imaginary axis representing a quadrature carrier, shown as a Q component). The angle of a constellation point, measured counterclockwise from the horizontal axis, represents a phase shift of a carrier wave from a reference phase. The distance to a constellation point, measured from the origin, represents the amplitude or power of the signal.

In a digital modulation system, information is transmitted as a series of samples, where each sample occupies a respective time period. During each sample, the carrier wave has a constant amplitude and phase value that is restricted to one of a finite number of values. Thus, each sample encodes one of a finite number of symbols, which in turn represents one or more binary digits (bits) of information. Each symbol is encoded as a combination of amplitude and phase of the carrier, and each symbol is represented by a point on the constellation diagram, called a constellation point. The constellation diagram shows all of the possible symbols that can be transmitted by the system as a collection of points. During demodulation, a demodulator identifies a constellation point with a highest likelihood of corresponding to a received signal (e.g., a received sample) and recovers binary digits based at least in part on the symbol associated with the identified constellation point.

As shown, a first symbol 402 and a second symbol 404 have a same Q-component value (e.g., are located a same distance from the I-component axis along the Q-component axis). The first symbol 402 and a third symbol 406 have a same I-component value (e.g., are located a same distance from the Q-component axis along the I-component axis). In some examples, a first (leftmost) bit position may indicate a sign of the I-component. In some examples, a second bit may indicate an amplitude of the I-component. In some examples, a third bit may indicate a sign of the Q-component. In some examples, a fourth bit may indicate an amplitude of the Q-component. Aspects of the present disclosure relate to manipulating the probability of occurrence of certain sets of bits such that symbols closer to a center of the constellation diagram (such as symbol 404) occur more often than symbols further from a center of the constellation diagram (such as symbol 406). For example, aspects of the present disclosure may manipulate the probability of occurrence of bits indicating amplitude of the I-component and/or the Q-component, such as the second bit and the fourth bit.

Example 400 is an example of a 16QAM constellation diagram, which uses m=4 bits per symbol. For a constellation diagram with m bits per symbol (where m is greater than 4 and a multiple of 2), a first bit may indicate a sign of the I-component, a second bit may indicate a sign of the Q-component, $$\left(\frac{m}{2} - 1\right)$$

third bits may indicate an amplitude of the I-component, and $$\left(\frac{m}{2} - 1\right)$$

fourth bits may indicate an amplitude of the Q-component. Aspects of the present disclosure relate to manipulating the probability of occurrence of certain sets of bits such that symbols closer to a center of the constellation diagram (such as symbol 404) occur more often than symbols further from a center of the constellation diagram (such as symbol 406). For example, aspects of the present disclosure may manipulate the probability of occurrence of bit(s) indicating amplitude of the I-component and/or the Q-component.

Figure 5:
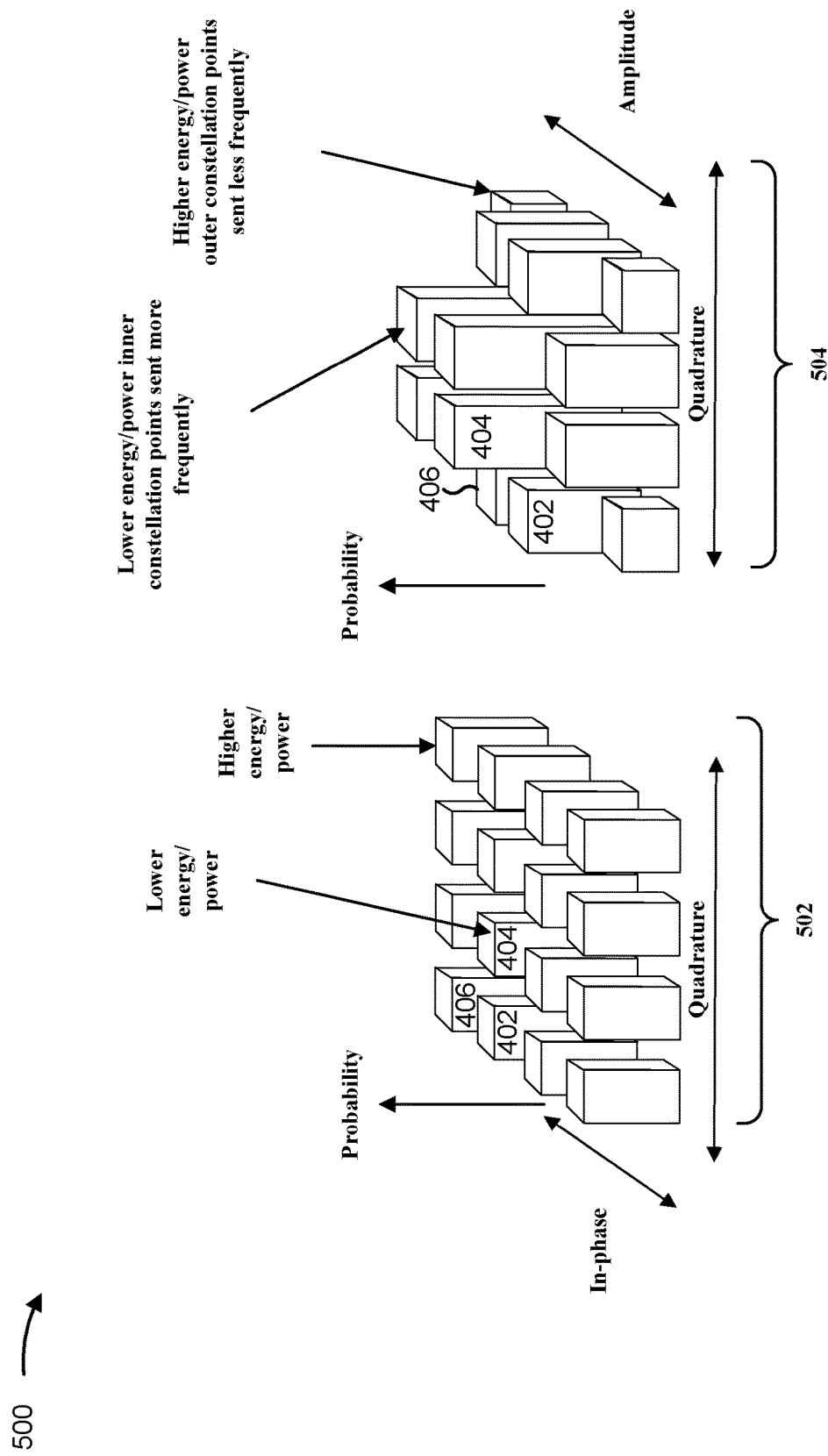
FIG. 5 is a diagram illustrating a first probability distribution among points in a constellation associated with a quadrature amplitude modulation (QAM) and a second probability distribution among the points in the constellation associated with the QAM, in accordance with the present disclosure.

FIG. 5 is a diagram 500 illustrating a first (unshaped and/or uniform) probability distribution 502 among points in a constellation associated with a QAM and a second (shaped) probability distribution 504 among the points in the constellation associated with the QAM in accordance with some aspects of the disclosure. As shown, in the second probability distribution 504, the probability of lower-energy points in the constellation may be increased while the probability of higher-energy points in the constellation may be decreased. The probability distributions corresponding to symbols 402, 404, and 406 of FIG. 4 are indicated in probability distributions 502 and 504 to aid in understanding.

To manipulate the probability of certain points/symbols of the constellation being transmitted, PAS can be used to shape one or more amplitude bits (that is, bits indicating an amplitude of an I-component or a Q-component of a constellation diagram). With single-bit shaping, only the most significant bits of the I-component amplitude and the Q-component amplitude are shaped, which results in a relatively smaller number of probability distribution levels (or buckets) for constellation points. For example, for 64QAM, 2 amplitude bits are used for each of the I-component and the Q-component. If only the most significant bit (MSB) of a given component (of the I-component and the Q-component) is shaped, fewer probability distribution levels are possible. If multiple bits are shaped (including the MSB and one or more additional bits), more levels are achievable, which improves the overall energy profile and flexibility of PAS. For example, for single-bit shaping for 64QAM (in which the I-component and the Q-component have 2 amplitude bits each, and only the MSB is shaped), the probability of occurrence of a given combination of bits corresponding to a given amplitude of the I-component and the Q-component is given by the product of the probabilities of the MSB (u0) with the probability of the least significant bit (LSB) (u1) (where a probability distribution of the least significant bit is unshaped and is $P(u_1=0)$):

$$P(\text{Amplitude} = 00) = P(u_0 = 0) \cdot P(u_1 = 0) = 0.5 \cdot P(u_0 = 0)$$

$$P(\text{Amplitude} = 01) = P(u_0 = 0) \cdot P(u_1 = 1) = 0.5 \cdot P(u_0 = 0)$$

-continued
$$P(\text{Amplitude} = 10) = P(u_0 = 1) \cdot P(u_1 = 0) = 0.5 \cdot P(u_0 = 1)$$

$$P(\text{Amplitude} = 11) = P(u_0 = 1) \cdot P(u_1 = 1) = 0.5 \cdot P(u_0 = 1)$$

As shown above (assuming $P(u_0=0) \neq P(u_0=1)$ because of the probabilistic shaping), only 2 different probability levels are achievable ($0.5 \cdot P(u_0=0)$ and $0.5 \cdot P(u_0=1)$). Thus, with 2 probability levels (1-bit shaping), for the I-component and the Q-component, the constellation mapping probability distribution can use 3 levels:

$$L1 = P(I \text{ Amplitude} = 00 \text{ or } 01) \cdot P(Q \text{ Amplitude} = 00 \text{ or } 01)$$

$$L2 = P(I \text{ Amplitude} = 10 \text{ or } 11) \cdot P(Q \text{ Amplitude} = 00 \text{ or } 01)$$

$$L3 = P(I \text{ Amplitude} = 00 \text{ or } 01) \cdot P(Q \text{ Amplitude} = 10 \text{ or } 11)$$

L2 also includes $P(I \text{ Amplitude}=00 \text{ or } 01) \cdot P(Q \text{ Amplitude}=10 \text{ or } 11)$.

If both the MSB and the LSB are shaped (assuming $P(u_0=0) \neq P(u_0=1)$ and $P(u_1=0) \neq P(u_1=1)$), there can be 4 distinct probability levels for I-component and Q-component amplitudes:

$$P(\text{Amplitude} = 00) = P(u_0 = 0) \cdot P(u_1 = 0)$$

$$P(\text{Amplitude} = 01) = P(u_0 = 0) \cdot P(u_1 = 1)$$

$$P(\text{Amplitude} = 10) = P(u_0 = 1) \cdot P(u_1 = 0)$$

$$P(\text{Amplitude} = 11) = P(u_0 = 1) \cdot P(u_1 = 1)$$

With 4 probability levels (2-bit shaping), the constellation mapping probability distribution is expanded to 10 levels:

$$L1 = P(I \text{ Amplitude} = 00) \cdot P(Q \text{ Amplitude} = 00)$$

$$L2 = P(I \text{ Amplitude} = 00) \cdot P(Q \text{ Amplitude} = 01)$$

$$L3 = P(I \text{ Amplitude} = 00) \cdot P(Q \text{ Amplitude} = 10)$$

$$L4 = P(I \text{ Amplitude} = 00) \cdot P(Q \text{ Amplitude} = 11)$$

$$L5 = P(I \text{ Amplitude} = 01) \cdot P(Q \text{ Amplitude} = 01)$$

$$L6 = P(I \text{ Amplitude} = 01) \cdot P(Q \text{ Amplitude} = 10)$$

$$L7 = P(I \text{ Amplitude} = 01) \cdot P(Q \text{ Amplitude} = 11)$$

$$L8 = P(I \text{ Amplitude} = 10) \cdot P(Q \text{ Amplitude} = 10)$$

$$L9 = P(I \text{ Amplitude} = 10) \cdot P(Q \text{ Amplitude} = 11)$$

$$L10 = P(I \text{ Amplitude} = 11) \cdot P(Q \text{ Amplitude} = 11)$$

Here, similarly to the 1-bit shaping case, some of the probability levels include two or more combinations of probabilities for the in-phase component and the quadrature component, so only 10 levels are shown. Thus, two-bit shaping offers more distribution levels of the constellation mapping as compared to one-bit shaping.

PAS tends to preserve the channel capacity relative to non-shaped transmissions, as demonstrated here in terms of mutual information. For example, PAS can be viewed as "inverse source coding," in which uniformly distributed (in probability) information bits are converted or manipulated into non-uniformly distributed bits (corresponding to non-uniformly distributed amplitudes of an I-component or a Q-component). PAS also impacts the mutual information between transmitted X and received symbols Y. The mutual information between X, Y is given by I(X; Y)=H(X)–H(X/Y), where H(X) is the entropy of X and H(X/Y) is the conditional entropy of X given Y. Generally, after PAS (assuming for simplicity that a symbol corresponds to a bit), $P(X_i=0)$ and $P(X_i=1)$ are not equal. Hence, the value of entropy H(X) is decreased due to PAS. Also, the conditional entropy H(X/Y) is determined by the forward error coding and is equal to $1-R_{FEC}$, where $R_{FEC}$ is the coding rate. With PAS, $R_{FEC}$ may be increased to compensate for the shaping rate (defined as the ratio of number of payload bits before (K) and after shaping $$(M), R_{Shaping} = \frac{K}{M}\bigg).$$

Thus, the difference between H(X) and H(X/Y) (that is, the mutual information I(X; Y)=(H(X)–H(X/Y)) tends to be the same as the difference between H(X) and H(X/Y) of a non-shaped transmission, meaning that the channel capacity tends to be preserved.

In aspects described herein, a set of amplitude shaping target values are used to configure PAS using NBPC. The set of amplitude shaping target values may be derived from the second probability distribution 504. For example, the set of amplitude shaping target values may define a target probability distribution of a constellation. As a simple example, consider a symbol with four possible values: 0, 1, $\alpha$, and $\alpha^2$, each corresponding to a different set of bits. In this example, it may be beneficial to shape probabilities of occurrence of certain sets of bits such that the symbol values 0 and 1 are most likely to occur (that is, so that the sets of bits corresponding to symbol values 0 and 1 are most likely to occur). In this example, the set of amplitude shaping target values may include [0.7 0.25 0.045 0.005], corresponding to probabilities [P(0) P(1) P($\alpha$) P($\alpha^2$)], respectively. Aspects of the present disclosure provide PAS, using the set of amplitude shaping target values, to achieve the desired probabilities [P(0) P(1) P($\alpha$) P($\alpha^2$)]. For example, an input bitstring may be mapped to one or more symbols, and aspects of the present disclosure provide for NBPC-based coding of the one or more symbols to achieve the desired probabilities.

Figure 6:
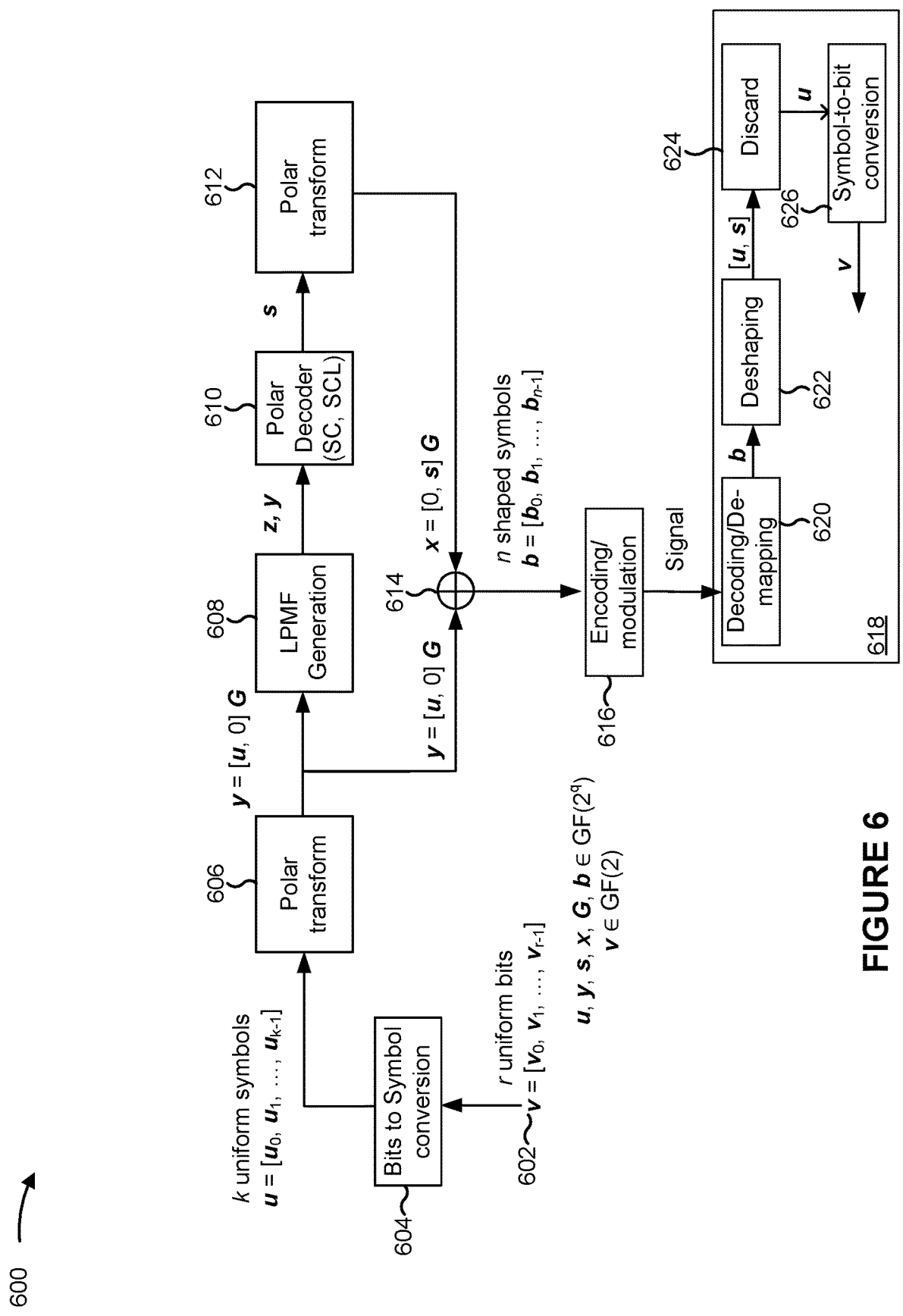
FIG. 6 is a diagram illustrating an example of probabilistic amplitude shaping (PAS) using non-binary polar coding (NBPC) in accordance with the present disclosure.

FIG. 6 is a diagram illustrating an example 600 of PAS using NBPC in accordance with the present disclosure. The operations of FIG. 6 may be performed by a transmitter, such as a UE 120 or a network node 110. In the context of FIG. 6, "symbol" generally refers to an element having more than two possible values (that is, associated with a Galois field with an order greater than two). For example, in the context of 16QAM communication, the symbols described with regard to FIG. 6 may generally belong to GF(4). The techniques described herein can be applied for any GF(q), where q is a positive integer. In some examples, q is greater than 2.

In the description of FIGS. 6-9, reference is made to non-binary polar transformation encoding operations. Non-binary polar transformation encoding is performed using a generator matrix G. The notation o=w G denotes that a non-binary polar transformation encoding operation is performed on a vector w, using a generator matrix G, to generate an encoded vector o. Additional detail regarding non-binary polar transformation encoding operations is provided elsewhere herein.

In a first operation 602, the transmitter may obtain a first bit vector (denoted v). The first bit vector v may include a quantity of bits (r bits) of GF(2) (that is, v∈ GF(2)). The r bits may optionally have a uniform probability distribution. For example, the probability of a bit of the quantity of bits being set to 0 may be equal to the probability of the bit being set to 1 (in other words, $P(v_i=0)=P(v_i=1)=0.5$). In a second operation 604, the transmitter may convert the bit vector to a first symbol vector (denoted u) including a quantity k of data symbols where each data symbol has q possible values. For example, k may be equal to r/q, and u∈GF(q). In some aspects, each data symbol $u_i$ of the first symbol vector u may have a uniform probability distribution. For example, given possible values [0 1 $\alpha$ $\alpha^2$], [P(0) P(1) P($\alpha$) P($\alpha^2$)] may be [0.25 0.25 0.25 0.25]. The bit-to-symbol conversion can use any suitable technique, such as mapping of bitstrings to corresponding symbols. In just one example, a codebook may be defined in which bitstrings [00 01 10 11] are mapped to symbol values [0 1 $\alpha$ $\alpha^2$], respectively.

The transmitter may perform a first non-binary polar transformation encoding operation 606 on the first symbol vector u. For example, the transmitter may perform the first non-binary polar transformation encoding operation 606 using one or more data symbols $u_i$ of the first symbol vector u. The first non-binary polar transformation encoding operation 606 generates a second symbol vector y including a quantity of transformed data symbols $y_i$. The second symbol vector y is shown in FIG. 6 as y=[u, 0]G, where u's position in the second symbol vector y as illustrated here indicates that the k data symbols of the first symbol vector are associated with first (e.g., frozen, lower-reliability) locations. This is because, in the first non-binary polar transformation encoding operation 606, unlike typical polar encoding, the k data symbols of the first symbol vector u may be associated with (that is, placed on) lower-reliability locations of the first non-binary polar transformation encoding operation 606, and zeroes may be associated with (that is, placed on) higher-reliability locations of the first non-binary polar transformation encoding operation 606.

In an operation 608, the transmitter may generate a set of probability values (represented by z) associated with a set of amplitude shaping target values. For example, the set of probability values may be defined by or represented by an LPMF. Thus, the operation 608 may include an LPMF generation operation, and the set of probability values may be a set of soft values. The generation of the set of probability values may use the second symbol vector y as an input. For example, for each transformed data symbol $y_i$ in the second symbol vector y, z may include a length q vector $z_i$. Assuming GF(4), q=2, and four soft values of $z_i$ may provide the probability of transformed data symbol $y_i$ having a value [0 1 $\alpha$ $\alpha^2$], respectively. Thus, if the dimension of the second symbol vector y is N×1, then the dimension of z is N×q.

As mentioned, the generation of the set of probability values may include LPMF generation. A description of LPMF generation is provided below. Before the description of LPMF generation, a description of LLR generation is provided to facilitate explanation of LPMF generation. "LLR generation" and "LPMF generation" are associated with the binary symmetric channel on which a channel input $x_i$ experiences noise $\rho_i$ and is received as a channel output $y_i$ (so $y_i=x_i \oplus \rho_i$). Note that the notation of the channel input and the channel output use the same variable names as the second symbol vector and the fourth symbol vector described herein, but the channel input and the channel output may or may not be the same as the second symbol vector or the fourth symbol vector.

In the context of LLR generation, in which the channel input, the noise, and the channel output each have a binary output ($x_i$, $y_i$, $\rho_i \in GF(2)$ i.e. $\{0, 1\}$), the LLR of a given bit $x_i$ of the channel input can be expressed as:

$$LLR(x_i) = \log\left(\frac{P(x_i = 0/y_i)}{P(x_i = 1/y_i)}\right) = \log\left(\frac{P(y_i/x_i = 0)}{P(y_i/x_i = 1)}\right) = \log\left(\frac{P(0 + \rho_i = y_i)}{P(1 + \rho_i = y_i)}\right)$$

In the context of PAS, the noise of the channel may be assigned particular probabilities: $P(\rho_i=0)=A$, $P(\rho_i=1)=B$. Therefore, $$LLR(x_i) = \log\left(\frac{P(\rho_i = 0 + y_i)}{P(\rho_i = 1 + y_i)}\right) = (-1)^{y_i} \log \frac{A}{B}.$$

In this expression, the sign of the LLR (as provided by $(-1)^{y_i}$) is based on a set of transformed data symbols (which may be provided by $y=[u, 0]G$ in the polar-coding-based PAS context), and an amplitude of the LLR is based on a target probability distribution (by A and B above). In the context of PAS, A and B may be amplitude shaping target values or may be derived from amplitude shaping target values.

As mentioned, LPMF generation may be performed when generating the set of probability values in the operation 608. For example, the LPMFs may be calculated from the target shaping distribution (that is, the amplitude shaping target values, representing the probability that a two-bit symbol will assume each of the four possible GF (4) values in the final shaped sequence). Variable names used in the description of LPMF generation are generally consistent with variable names used in the description of LLR generation above. In LPMF, each of the channel input, the noise, and the channel output may have more than two possible values. That is, in LPMF, $x_i$, $y_i$, $\rho_i \in GF(q)$ and in some contexts q is greater than 2. An LPMF may give the probability of a given symbol $x_i$ of the channel input being each of multiple possible values, such as $\{0, 1, \alpha, \alpha^2 \ldots, \alpha^{q-2}\}$. Hence, unlike $LLR(x_i)$ in binary being a single value corresponding to a bit $x_i$, $LPMF(x_i)$ corresponding to symbol $x_i$ is a length-q vector. For example, an LPMF defining a set of probability values for values $\{0, 1, \alpha, \alpha^2 \ldots, \alpha^{q-2}\}$ of symbol $x_i$ may be represented by the formula $LPMF(x_i=f_l)=[\tau_{f_l}(0) \; \tau_{f_l}(1) \; \tau_{f_l}(\alpha) \; \tau_{f_l}(\alpha^2) \ldots \tau_{f_l}(\alpha^{q-2})]$, wherein $$\tau_{f_l}(w) = \log\left(\frac{P(x_i = w/y_i)}{P(x_i = f_l/y_i)}\right),$$

and wherein w, $f_l \in GF(q)$. Here, $f_l$ may represent a normalization value and w may represent a given value of $x_i$. As above, the noise $\rho_i$ of the channel may be associated with certain probabilities which may be derived from the amplitude shaping target values, as shown below.

For four possible values of symbol $x_i$ ($\{0, 1, \alpha, \alpha^2\}$), and expanding the above formula, the LPMF is represented by a vector:

$$\left[\log\left(\frac{P(x_i = 0/y_i)}{P(x_i = 0/y_i)}\right) \log\left(\frac{P(x_i = 1/y_i)}{P(x_i = 0/y_i)}\right)\right.$$

$$\left.\log\left(\frac{P(x_i = \alpha/y_i)}{P(x = 0/y_i)}\right) \log\left(\frac{P(x_i = \alpha^2/y_i)}{P(x_i = 0/y_i)}\right)\right]$$

A normalization operation can be performed on this vector by dividing by $P(\rho_i=y_i)$. The normalization operation may reduce a size of the vector by setting a first term, for example, to zero, which enables operation on a three-element vector instead of a four-element vector:

$$\left[0 \; \log\left(\frac{P(\rho_i = 1 + y_i)}{P(\rho_i = 0 + y_i)}\right) \; \log\left(\frac{P(\rho_i = \alpha + y_i)}{P(\rho_i = 0 + y_i)}\right) \; \log\left(\frac{P(\rho_i = \alpha^2 + y_i)}{P(\rho_i = 0 + y_i)}\right)\right]$$

Expanding the above normalized vector for each potential output value $y_i$: when $y_i = 0$, $LPMF(x_i) =$ $$\left[0 \; \log\left(\frac{P(\rho_i = 1 + 0)}{P(\rho_i = 0 + 0)}\right) \; \log\left(\frac{P(\rho_i = \alpha + 0)}{P(\rho_i = 0 + 0)}\right) \; \log\left(\frac{P(\rho_i = \alpha^2 + 0)}{P(\rho_i = 0 + 0)}\right)\right],$$

which is equivalent to $$\left[0 \; \log\left(\frac{P(\rho_i = 1)}{P(\rho_i = 0)}\right) \; \log\left(\frac{P(\rho_i = \alpha)}{P(\rho_i = 0)}\right) \; \log\left(\frac{P(\rho_i = \alpha^2)}{P(\rho_i = 0)}\right)\right].$$

When $y_i=1$, $LPMF(x_i) =$ $$\left[0 \; \log\left(\frac{P(\rho_i = 1 + 1)}{P(\rho_i = 0 + 1)}\right) \; \log\left(\frac{P(\rho_i = \alpha + 1)}{P(\rho_i = 0 + 1)}\right) \; \log\left(\frac{P(\rho_i = \alpha^2 + 1)}{P(\rho_i = 0 + 1)}\right)\right],$$

which is equivalent to $$\left[0 \; \log\left(\frac{P(\rho_i = 0)}{P(\rho_i = 1)}\right) \; \log\left(\frac{P(\rho_i = \alpha^2)}{P(\rho_i = 1)}\right) \; \log\left(\frac{P(\rho_i = \alpha)}{P(\rho_i = 1)}\right)\right].$$

When $y_i=\alpha$, $LPMF(x_i) =$ $$\left[0 \; \log\left(\frac{P(\rho_i = 1 + \alpha)}{P(\rho_i = 0 + \alpha)}\right) \; \log\left(\frac{P(\rho_i = \alpha + \alpha)}{P(\rho_i = 0 + \alpha)}\right) \; \log\left(\frac{P(\rho_i = \alpha^2 + \alpha)}{P(\rho_i = 0 + \alpha)}\right)\right],$$

which is equivalent to $$\left[0 \; \log\left(\frac{P(\rho_i = \alpha^2)}{P(\rho_i = \alpha)}\right) \; \log\left(\frac{P(\rho_i = 0)}{P(\rho_i = \alpha)}\right) \; \log\left(\frac{P(\rho_i = 1)}{P(\rho_i = \alpha)}\right)\right].$$

When $y_i=\alpha^2$, $LPMF(x_i) =$ $$\left[0 \quad \log\left(\frac{P(\rho_i = 1+\alpha^2)}{P(\rho_i = 0+\alpha^2)}\right) \quad \log\left(\frac{P(\rho_i = \alpha+\alpha^2)}{P(\rho_i = 0+\alpha^2)}\right) \quad \log\left(\frac{P(\rho_i = \alpha^2+\alpha^2)}{P(\rho_i = 0+\alpha^2)}\right)\right],$$

which is equivalent to $$\left[0 \quad \log\left(\frac{P(\rho_i = \alpha)}{P(\rho_i = \alpha^2)}\right) \quad \log\left(\frac{P(\rho_i = 1)}{P(\rho_i = \alpha^2)}\right) \quad \log\left(\frac{P(\rho_i = 0)}{P(\rho_i = \alpha^2)}\right)\right].$$

Thus, for GF(q), $x_i$, $y_i$, $\rho_i \in$ GF(q), and a soft input (set of probability values) of a non-binary polar transformation decoding operation 610 corresponding to $y_i$ is one of the q possible LPMF($x_i$) vectors defined above. Corresponding to a symbol $y_i$ in the second symbol vector y, there exists a length q vector $z_i$ in the set of probability values z. Assuming GF(4), q=4 and the 4 soft values of $z_i$ give the probabilities of symbol $y_i$ of the second symbol vector y being each of 0, 1, $\alpha$, $\alpha^2$. Hence, if the dimension of the second symbol vector y is N×1, then the dimension of z is N×q.

As shown, the transmitter may perform a non-binary polar transformation decoding operation 610. The non-binary polar transformation decoding operation 610 may receive, as input, the set of probability values (that is, soft inputs represented by the vector z) generated in the operation 608. The non-binary polar transformation decoding operation 610 may also receive the second symbol vector y. The non-binary polar transformation decoding operation 610 may output a third symbol vector, denoted s, including a first set of shaping symbols. The non-binary polar transformation decoding operation 610 may use a soft decoder, such as a successive cancellation (SC) decoder, an SC list (SCL) decoder, or a belief propagation (BP) decoder. In the non-binary polar transformation decoding operation 610, zeroes or other fixed values may be associated with (placed on) first (e.g., frozen, lower-reliability) locations.

As shown, the transmitter may perform a second non-binary polar transformation encoding operation 612 on the third symbol vector s. For example, in the second non-binary polar transformation encoding operation 612, zeroes may be associated with (placed on) first (e.g., frozen, lower-reliability) locations, and shaping symbols si of the first set of shaping symbols s may be associated with (placed on) second (e.g., information, higher-reliability) locations, represented by the placement of "0" and s in the representation of x below. The second non-binary polar transformation encoding operation 612 may output a fourth symbol vector x, which is illustrated as x=[0, s]G to represent the second non-binary polar transformation encoding operation 612 being performed on the first set of shaping symbols. The fourth symbol vector x may include a second set of shaping symbols. By generating the second set of shaping symbols of the fourth symbol vector x using the non-binary polar transformation decoding operation 610 (using probability values derived from the second symbol vector y and the amplitude shaping target values) and the second non-binary polar transformation encoding operation 612, the second set of shaping symbols can be combined with the second symbol vector y to generate a fifth symbol vector b of shaped symbols, as described below.

As shown, the transmitter may perform a combination operation 614 on the second symbol vector y and the fourth symbol vector x to obtain a fifth symbol vector b of n shaped symbols. In some aspects, the combination operation 614 may include an addition operation (such as a Galois addition operation) with a same order as the symbols of the first symbol vector (that is, GF(q)). In some aspects, the combination operation 614 may additionally or alternatively include a non-binary polar transformation encoding operation on the combined second symbol vector y and the fourth symbol vector x. Thus, the transmitter obtains shaped symbols via NBPC, which facilitates PAS using NBPC.

The transmitter may transmit a signal modulated in accordance with the fifth symbol vector. For example, the transmitter may map shaped symbols of the fifth symbol vector to constellation points of a constellation. In some examples, the symbols of the fifth symbol vector may tend to be mapped to constellation points associated with a lower power or energy as a result of the PAS. Thus, power or energy consumption at the transmitter is reduced.

As shown, the transmitter may perform an encoding and/or modulation operation 616 using the fifth symbol vector b. For example, the encoding and/or modulation operation 616 may include a forward error correction (FEC) encoding operation (such as a low-density parity check (LDPC) encoding operation), a QAM operation, a combination thereof, or another form of encoding and/or modulation operation. In some aspects, the modulation operation may be referred to as a mapping operation. The transmitter may transmit a signal (e.g., a wireless communication) carrying the fifth symbol vector b. For example, the signal may be encoded and modulated in accordance with the fifth symbol vector b.

A receiver 618 (such as a UE 120 or a network node 110) may receive the signal. The receiver may perform a decoding and/or de-mapping operation 620 to obtain the fifth symbol vector b. As described above, the fifth symbol vector b may be generated based on a set of shaping symbols(s) and one or more data symbols $u_i$ of the first symbol vector u. In some aspects, the de-mapping operation may be referred to as a demodulation operation or a soft demodulation operation. The receiver may perform a deshaping operation 622 on the fifth symbol vector b. The deshaping operation 622 may include a non-binary polar transformation encoding operation using an inverse ($G^{-1}$) of the generator matrix (G) that was used to generate the second symbol vector y and the fourth symbol vector x. Thus, the receiver may obtain a symbol vector including the set of shaping symbols(s) and the one or more data symbols $u_i$ of the first symbol vector u. In a discarding operation 624, the receiver may discard the set of shaping symbols(s). The receiver may perform a symbol-to-bit conversion operation 626 to obtain the bits $v_i$ of the first bit vector v.

PAS using NBPCs may provide certain advantages at the receiver. For example, the transmitter can use FEC codes with a higher code rate and manipulate the shaping rate (defined as the ratio of the number of payload bits before shaping and the number of payload bits after shaping) to adapt to different channel conditions. With a higher code rate FEC, efficiency of the FEC decoder (such as the LDPC decoder) may be increased in terms of throughput/area because the FEC decoder hardware latency and area is generally dominated by the minimum code rate supported. Furthermore, the de-mapping operation may take advantage of the amplitude shaping target values (or target distribution of constellation points) to improve its performance. For example, the de-mapper may add an LPMF adjustment to a final LPMF result of the de-mapping. In a traditional approach (without accounting for the amplitude shaping target values), a de-mapper may compute an LPMF as $\text{LPMF}_{channel}(f_l)=f((rx(i)-const)^2)$, where f is a de-mapping function (typically a minimum over all constellation points with $f_l$ appearing in the constellation index). If symbol rx(i) is associated with a probability value (such as may be derived from an amplitude shaping target value), then LPMFchannel can be adjusted before providing LPMFchannel to the decoder: $\text{LPMF}_{dec}=\text{LPMF}_{channel}+\text{LPMF}_{apriori}$.

A non-binary polar encoding operation, as described herein, may be performed by multiplying elements of a vector (for example, [u, 0], [0, s], or [u, s]) by a generator matrix G. The elements $\gamma$, $\beta$, $\delta \in GF(q)$, and the generator matrix G, for GF(q), is $$G = \begin{bmatrix} \gamma & 0 \\ \beta & \delta \end{bmatrix}.$$

Higher-dimension generator matrices $G_{4\times4}$ and $G_{8\times8}$ are generated using the Kronecker product of $G_{2\times2}$ (illustrated here assuming $\gamma=1$, $\beta=\alpha$, $\delta=1$):

$$G_{4\times4} = \begin{bmatrix} 1 & 0 \\ \alpha & 1 \end{bmatrix}^{\otimes 2}$$

or equivalently $$\begin{bmatrix} 1 & 0 & 0 & 0 \\ \alpha & 1 & 0 & 0 \\ \alpha & 0 & 1 & 0 \\ \alpha^2 & \alpha & \alpha & 1 \end{bmatrix}.$$

$$G_{8\times8} = \begin{bmatrix} 1 & 0 \\ \alpha & 1 \end{bmatrix}^{\otimes 3}$$

or equivalently $$\begin{bmatrix} 1 & 0 & 0 & 0 & 0 & 0 & 0 & 0 \\ \alpha & 1 & 0 & 0 & 0 & 0 & 0 & 0 \\ \alpha & 0 & 1 & 0 & 0 & 0 & 0 & 0 \\ \alpha^2 & \alpha & \alpha & 1 & 0 & 0 & 0 & 0 \\ \alpha & 0 & 0 & 0 & 1 & 0 & 0 & 0 \\ \alpha^2 & \alpha & 0 & 0 & \alpha & 1 & 0 & 0 \\ \alpha^2 & 0 & \alpha & 0 & \alpha & 0 & 0 & 0 \\ \alpha^3 & \alpha^2 & \alpha^2 & \alpha & \alpha^2 & \alpha & 0 & 0 \end{bmatrix}.$$

Here, $\alpha^3=1$.

A non-binary polar transformation decoding operation, as described herein for example at non-binary polar transformation decoding operation 610, may involve a parallel process in which multiple symbols are decoded simultaneously. An example structure of a soft decoder is provided below for order 4 (q=4, GF(4)), though these expressions can be extended to GF(q). In the following description, $\alpha=1$ (in this context, $\alpha$ represents a parameter used to perform non-binary polar decoding), $\beta \in \{1, \alpha, \alpha^2\}$ (in this context, $\alpha$ represents an element of GF(4)), and $\delta=1$. For example, the probability of a given data symbol $u_0$ being equal to a given value $f_l$ (where $u_0$ and $f_l$ belong to GF(4)) can be expressed in terms of a convolution of vectors r and s' as:

$$p_{u_0}(f_l)=r(f_l)*s'(f_l),$$

where "*" represents a mono-dimensional convolution over GF(4). Given that $p_{u_0}(f_l)=P(u_0=f_l)$, $$r = [\, P(y_0 = 0) \quad P(y_0 = 1) \quad P(y_0 = \alpha) \quad P(y_0 = \alpha^2) \,],$$
$$s = [\, P(y_1 = 0) \quad P(y_1 = 1) \quad P(y_1 = \alpha) \quad P(y_1 = \alpha^2) \,], \text{ and}$$
$$s' = [\, P(y'_1 = 0) \quad P(y'_1 = 1) \quad P(y'_1 = \alpha) \quad P(y'_1 = \alpha^2) \,].$$

and

Given that $y_1'=y_1\odot\beta$, then $y_1=\beta^{-1}\odot y_1'$ and $s'(f_l)=s(\beta^{-1}\odot f_l)$. Here, $\odot$ denotes multiplication in GF (that is, Galois multiplication). Hence, $p_{u_0}(f_l)=r(f_l)*s'(f_l)=r(f_l)*s(\beta^{-1}\odot f_l)$, where $f_l$, $c \in GF(4)$. This can be expressed as a summation: $\Sigma_{k=0}^{\alpha^2} s(\beta^{-1}\odot f_l) \cdot r(f_l \oplus k)$. Expanding the summation: $p_{u_0}(f_l)= s(0)r(f_l)+s(\beta^{-1})r(f_l \oplus 1)+s(\beta^{-1}\odot\alpha)r(f_l\oplus\alpha)+s(\beta_{-1}\odot\alpha^2)r(f_l\oplus\alpha^2)$. By taking the logarithm of both sides, the expanded summation can be expressed as: $\log p_{u_0}(f_l)=\log(s(0)r(f_l)+s(\beta^{-1})r(f_l\oplus 1)+s(\beta^{-1}\odot\alpha)r(f_l\oplus\alpha)+s(\beta^{-1}\odot\alpha^2)r(f_l\oplus\alpha^2))$. Given the approximation $\log(A+B+C+D)\approx\max(\log A, \log B, \log C, \log D)$, the logarithmic expression can be approximated as:

$$P_{u_0}(f_l) = \text{Max}\begin{pmatrix} S(0) + R(f_l), S(\beta^{-1}) + R(f_l \oplus 1), \\ S(\beta^{-1} \odot \alpha) + R(f_l \oplus \alpha), S(\beta^{-1} \odot \alpha^2) + R(f_l \oplus \alpha^2) \end{pmatrix}$$

where $P_{u_0}(f_l)=\log P(u_0=f_l)$, $R(f_l)=\log P(y_0=f_l)$, $S(f_l)=\log P(y_1=f_l)$, and $f_l$, $c \in GF(4)$. Thus, $$\widehat{u_0} = \arg\max_{f_l \in GF(4)} P_{u_0}(f_l).$$

The probability of a given data symbol $u_l$ being equal to the given value $f_l$ (where $u_0$ and $f_l$ belong to GF(4)) can be expressed as $p_{u_1}(f_l)=s(f_l)\cdot r(\beta\odot f_l)\oplus u_0)$. In the logarithmic domain, this can be expressed as $P_{u_1}(f_l)=S(f_l)+R((\beta\odot f_l)\oplus u_0)$, where $P_{u_1}(f_l)=\log P(u_1=f_l)$, $R(f_l)=\log P(y_0=f_l)$, $S(f_l)=\log P(y_1=f_l)$, and $f_l$, $c$, $u_0 \in GF(4)$. Thus, $$\widehat{u_1} = \arg\max_{f_l \in GF(4)} P_{u_1}(f_l).$$

A non-binary polar transformation decoding operation (such as the non-binary polar transformation decoding operation 610) may be performed by inputting a second symbol vector (y) and a set of probability values (z) to the soft decoder defined above to generate a third symbol vector(s).

Figure 7:
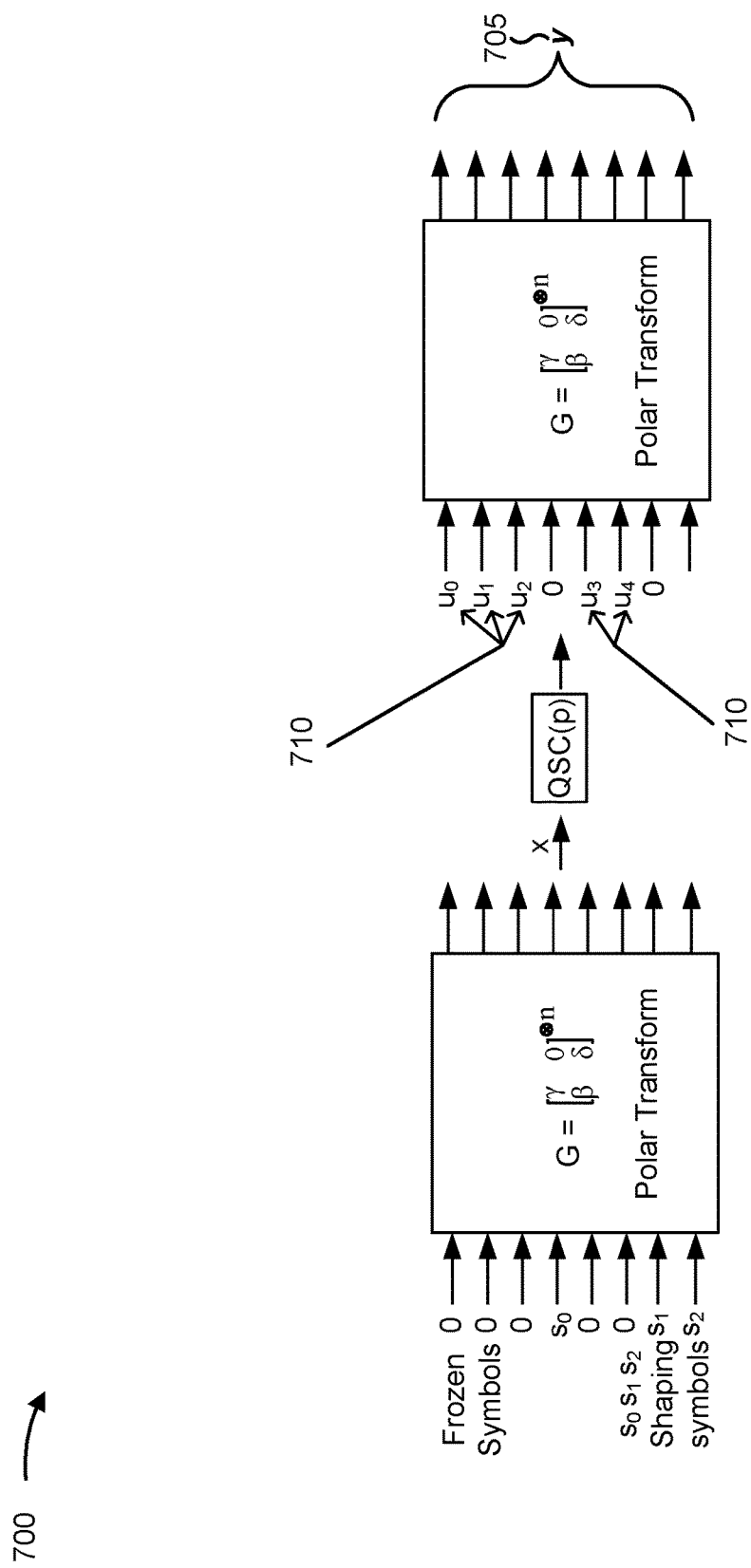
FIG. 7 is a diagram illustrating an example of polar encoding and decoding for PAS in accordance with the present disclosure.

FIG. 7 is a diagram illustrating an example 700 of polar encoding and decoding for PAS in accordance with the present disclosure. In example 700, PAS is performed for a set of data symbols u using a set of shaping symbols s. In some polar coding operations (such as for error correction), data bits u are padded with zeroes to provide parity in the encoded message. In the context of probabilistic shaping, data bits u are padded with shaping bits s and may be subject to a non-binary polar transformation encoding operation (or a Galois addition operation, if the data bits/symbols and the shaping bits have already been subject to polar transformation) to generate an output b shaped in the desired fashion. This operation can be represented as [u, s]G=b.

Since a polar code is a linear code, [u, s]G=b can be rewritten as [u, 0]G⊕[0, s]G=b or equivalently [u, 0]G=[0, s]G⊕b, where "⊕" denotes "exclusive or." Now, let y=[u, 0]G, x=[0, s]G, and ρ=b. Thus, [u, 0]G=[0, s]G⊕b can be reformulated as y=x+ρ, where ρ≈iid Bern(p) and p represents a crossover probability of a q-ary symmetric channel (QSC).

The generation of s is described in connection with FIG. 6, and additional description is provided here. Using the notation of example 700, a non-binary polar decoding operation can be performed in accordance with a vector y=[u, 0]G (illustrated by reference number 705) and a set of soft inputs (defined by or derived from the set of probability values z of FIG. 6). The set of soft inputs may be based on or May be used to generate the crossover probability or p. As mentioned in connection with FIG. 6, data symbols of a first symbol vector u may be associated with (that is, placed on) first (e.g., frozen, lower-reliability) locations of the first non-binary polar transformation encoding operation 606. This is illustrated by reference number 710. By placing the data symbols on the first locations for the first non-binary polar transformation encoding operation 606, the non-binary polar decoding operation may provide an output indicating shaping symbols s which may be associated with (such as based on or derived from) the set of probability values z and the data symbols u of the second symbol vector y.

Figure 8:
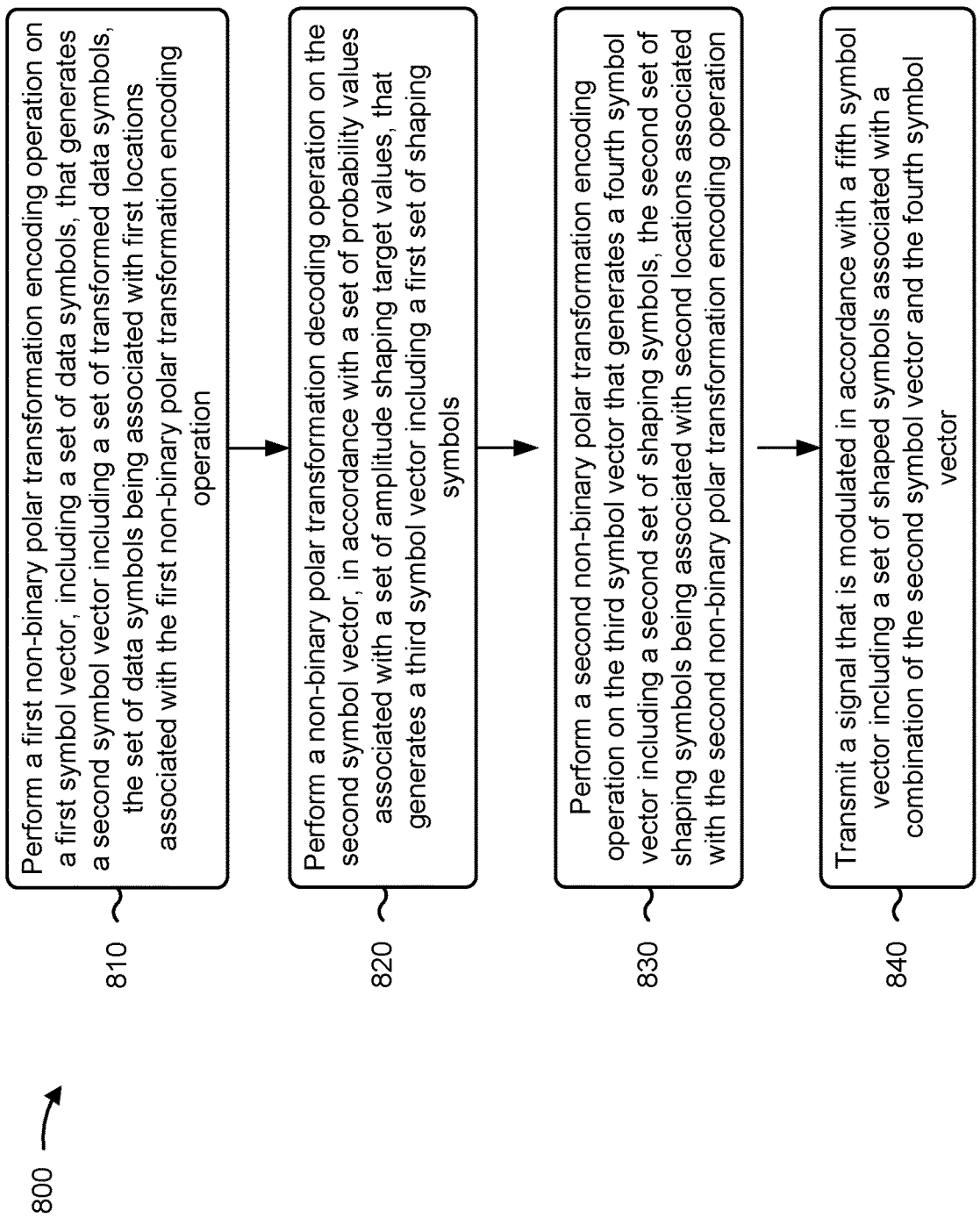
FIG. 8 is a flowchart illustrating an example process performed, for example, at a transmitter or an apparatus of a transmitter that supports PAS using NBPC in accordance with the present disclosure.

FIG. 8 is a flowchart illustrating an example process 800 performed, for example, at a wireless communication device or an apparatus of a wireless communication device that supports PAS using NBPC in accordance with the present disclosure. Example process 800 is an example where the apparatus or the wireless communication device (for example, UE 120 or network node 110) performs operations associated with PAS using NBPC. In some examples, the apparatus may comprise a processing system.

As shown in FIG. 8, in some aspects, process 800 may include performing a first non-binary polar transformation encoding operation on a first symbol vector, including a set of data symbols, that generates a second symbol vector including a set of transformed data symbols, the set of data symbols being associated with first locations associated with the first non-binary polar transformation encoding operation (block 810). For example, the wireless communication device or the apparatus (such as by using communication manager 140 or 150 or encoding component 908, depicted in FIG. 9) may perform a first non-binary polar transformation encoding operation (such as first non-binary polar transformation encoding operation 606) on a first symbol vector (u), including a set of data symbols ($u_i$), that generates a second symbol vector (y) including a set of transformed data symbols ($y_i$), the set of data symbols being associated with first locations associated with the first non-binary polar transformation encoding operation, as described above.

In some aspects, process 800 includes obtaining, prior to performing the first non-binary polar transformation encoding operation, a bit vector (v) including a quantity of bits, and converting the bit vector to the first symbol vector including the set of data symbols.

As further shown in FIG. 8, in some aspects, process 800 may include performing a non-binary polar transformation decoding operation on the second symbol vector, in accordance with a set of probability values associated with a set of amplitude shaping target values, that generates a third symbol vector including a first set of shaping symbols (block 820). For example, the wireless communication device or the apparatus (such as by using communication manager 140, communication manager 150, or decoding component 910, depicted in FIG. 9) may perform a non-binary polar transformation decoding operation (such as non-binary polar transformation decoding operation 610) on the second symbol vector (y), in accordance with a set of probability values (z) associated with a set of amplitude shaping target values, that generates a third symbol vector(s) including a first set of shaping symbols, as described above. In some aspects, process 800 includes computing (such as in an operation 608) the set of probability values for the second symbol vector according to the set of amplitude shaping target values. In some aspects, one or more transformed data symbols are on information locations associated with the non-binary polar transformation decoding operation.

In some aspects, each symbol of the set of data symbols has q possible values, and the set of probability values includes q values, wherein q is a positive integer. In some aspects, each symbol of the set of data symbols has q possible values, and the set of probability values includes fewer than q values. In some aspects, the set of probability values includes fewer than q values in accordance with a normalization operation. In some aspects, the set of probability values are defined by a log probability mass function.

In some aspects, the non-binary polar transformation decoding operation is associated with at least one of a successive cancellation decoder, a successive cancellation list decoder, or a belief propagation decoder. In some aspects, performing the non-binary polar transformation decoding operation comprises performing the non-binary polar transformation decoding operation on one or more transformed data symbols of the set of transformed data symbols.

As further shown in FIG. 8, in some aspects, process 800 may include performing a second non-binary polar transformation encoding operation on the third symbol vector that generates a fourth symbol vector including a second set of shaping symbols, the second set of shaping symbols being associated with second locations associated with the second non-binary polar transformation encoding operation (block 830). For example, the wireless communication device or the apparatus (such as by using communication manager 140, communication manager 150, or encoding component 908, depicted in FIG. 9) may perform a second non-binary polar transformation encoding operation (such as second non-binary polar transformation encoding operation 612) on the third symbol vector(s). The second non-binary polar transformation encoding operation may generate a fourth symbol vector (x) including a second set of shaping symbols. The second set of shaping symbols may be associated (such as placed on) with second locations associated with the second non-binary polar transformation encoding operation, as described above.

As further shown in FIG. 8, in some aspects, process 800 may include transmitting a signal that is modulated in accordance with a fifth symbol vector including a set of shaped symbols associated with a combination of the second symbol vector and the fourth symbol vector (block 840). For example, the wireless communication device or the apparatus (such as by using communication manager 140, communication manager 150, or transmission component 904, depicted in FIG. 9) may transmit a signal that is modulated in accordance with a fifth symbol vector (b) including a set of shaped symbols associated with a combination of the second symbol vector and the fourth symbol vector, as described above. In some aspects, the first symbol vector is associated with a uniform probability distribution with regard to values of the set of data symbols, and the fifth symbol vector is associated with a non-uniform probability distribution with regard to values of the set of shaped symbols. In some aspects, process 800 includes combining (such as in a combination operation 614), prior to transmitting the signal, the second symbol vector and the fourth symbol vector to generate the fifth symbol vector comprising the set of shaped symbols.

Although FIG. 8 shows example blocks of process 800, in some aspects, process 800 may include additional blocks, fewer blocks, different blocks, or differently arranged blocks than those depicted in FIG. 8. Additionally or alternatively, two or more of the blocks of process 800 may be performed in parallel.

Figure 9:
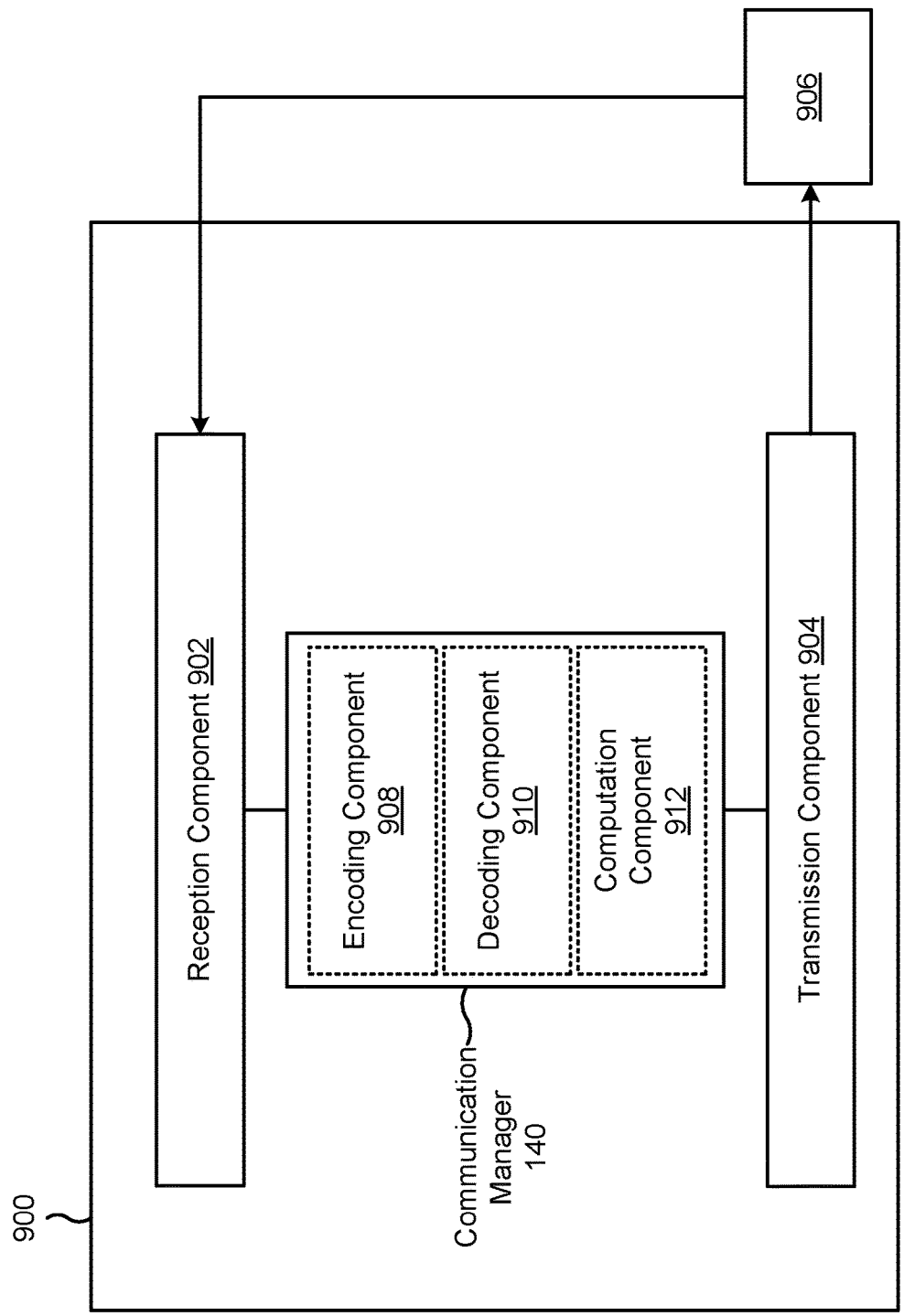
FIG. 9 is a diagram of an example apparatus for wireless communication that supports PAS using NBPC in accordance with the present disclosure.

FIG. 9 is a diagram of an example apparatus 900 for wireless communication that supports PAS using NBPC in accordance with the present disclosure. The apparatus 900 may be a wireless communication device, or a wireless communication device may include the apparatus 900. In some aspects, the apparatus 900 includes a reception component 902, a transmission component 904, and a communication manager 140 or 150, which may be in communication with one another (for example, via one or more buses). As shown, the apparatus 900 may communicate with another apparatus 906 (such as a UE, a network node, or another wireless communication device) using the reception component 902 and the transmission component 904.

In some aspects, the apparatus 900 may be configured to and/or operable to perform one or more operations described herein in connection with FIGS. 4-7. Additionally or alternatively, the apparatus 900 may be configured to and/or operable to perform one or more processes described herein, such as process 800 of FIG. 8. In some aspects, the apparatus 900 may include one or more components of the UE 120 or the network node 110 described above in connection with FIG. 2.

The reception component 902 may receive communications, such as reference signals, control information, and/or data communications, from the apparatus 906. The reception component 902 may provide received communications to one or more other components of the apparatus 900, such as the communication manager 140 or 150. In some aspects, the reception component 902 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components. In some aspects, the de-mapping or demodulation may be associated with one or more amplitude shaping target values. For example, the reception component 902 may bias the de-mapping or demodulation toward certain constellation points in accordance with the one or more amplitude shaping target values, thereby simplifying and reducing processor usage of the de-mapping or demodulation. In some aspects, the reception component 902 may include one or more antennas, one or more modems, one or more demodulators, one or more MIMO detectors, one or more receive processors, one or more controllers/processors, and/or one or more memories of the transmitter described above in connection with FIG. 2.

The transmission component 904 may transmit communications, such as reference signals, control information, and/or data communications, to the apparatus 906. In some aspects, the communication manager 140 or 150 may generate communications and may transmit the generated communications to the transmission component 904 for transmission to the apparatus 906. In some aspects, the transmission component 904 may perform signal processing on the generated communications (such as filtering, amplification, amplitude shaping, modulation, digital-to-analog conversion, multiplexing, interleaving, mapping, or encoding, among other examples), and may transmit the processed signals to the apparatus 906. In some aspects, the transmission component 904 may include one or more antennas, one or more modems, one or more modulators, one or more transmit MIMO processors, one or more transmit processors, one or more controllers/processors, and/or one or more memories of the transmitter described above in connection with FIG. 2. In some aspects, the transmission component 904 may be co-located with the reception component 902 in one or more transceivers.

The communication manager 140 or 150 may perform a first non-binary polar transformation encoding operation on a first symbol vector, including a set of data symbols, that generates a second symbol vector including a set of transformed data symbols, the set of data symbols being associated with frozen locations associated with the first non-binary polar transformation encoding operation. The communication manager 140 or 150 may perform a non-binary polar transformation decoding operation on the second symbol vector, in accordance with a set of probability values associated with a set of amplitude shaping target values, that generates a third symbol vector including a first set of shaping symbols. The communication manager 140 or 150 may perform a second non-binary polar transformation encoding operation on the third symbol vector that generates a fourth symbol vector including a second set of shaping symbols, the second set of shaping symbols being associated with information locations associated with the second non-binary polar transformation encoding operation. The communication manager 140 or 150 may transmit or may cause the transmission component 904 to transmit a signal that is modulated in accordance with a fifth symbol vector including a set of shaped symbols associated with a combination of the second symbol vector and the fourth symbol vector. In some aspects, the communication manager 140 or 150 may perform one or more operations described elsewhere herein as being performed by one or more components of the communication manager 140 or 150.

The communication manager 140 or 150 may include a processing system (which may include one or more controllers/processors, one or more memories, one or more schedulers, and/or one or more communication units of the transmitter described above in connection with FIG. 2). In some aspects, the communication manager 140 or 150 includes a set of components, such as an encoding component 908, a decoding component 910, and/or a computation component 912. Alternatively, the set of components may be separate and distinct from the communication manager 140 or 150. In some aspects, one or more components of the set of components may include or may be implemented within a processing system, one or more controllers/processors, one or more memories, one or more schedulers, and/or one or more communication units of the transmitter described above in connection with FIG. 2. Additionally or alternatively, one or more components of the set of components may be implemented at least in part as software stored in one or more memories. For example, a component (or a portion of a component) may be implemented as instructions or code stored in a non-transitory computer-readable medium and executable by one or more controllers or one or more processors to perform the functions or operations of the component.

The encoding component 908 may perform a first non-binary polar transformation encoding operation on a first symbol vector, including a set of data symbols, that generates a second symbol vector including a set of transformed data symbols, the set of data symbols being associated with frozen locations associated with the first non-binary polar transformation encoding operation. The decoding component 910 may perform a non-binary polar transformation decoding operation on the second symbol vector, in accordance with a set of probability values associated with a set of amplitude shaping target values, that generates a third symbol vector including a first set of shaping symbols. The encoding component 908 may perform a second non-binary polar transformation encoding operation on the third symbol vector that generates a fourth symbol vector including a second set of shaping symbols, the second set of shaping symbols being associated with information locations associated with the second non-binary polar transformation encoding operation. The transmission component 904 may transmit a signal that is modulated in accordance with a fifth symbol vector including a set of shaped symbols associated with a combination of the second symbol vector and the fourth symbol vector.

The encoding component 908 may combine, prior to transmitting the signal, the second symbol vector and the fourth symbol vector to generate the fifth symbol vector comprising the set of shaped symbols.

The computation component 912 may compute the set of probability values for the second symbol vector according to the set of amplitude shaping target values.

The number and arrangement of components shown in FIG. 9 are provided as an example. In practice, there may be additional components, fewer components, different components, or differently arranged components than those shown in FIG. 9. Furthermore, two or more components shown in FIG. 9 may be implemented within a single component, or a single component shown in FIG. 9 may be implemented as multiple, distributed components. Additionally or alternatively, a set of (one or more) components shown in FIG. 9 may perform one or more functions described as being performed by another set of components shown in FIG. 9.

Figure 10:
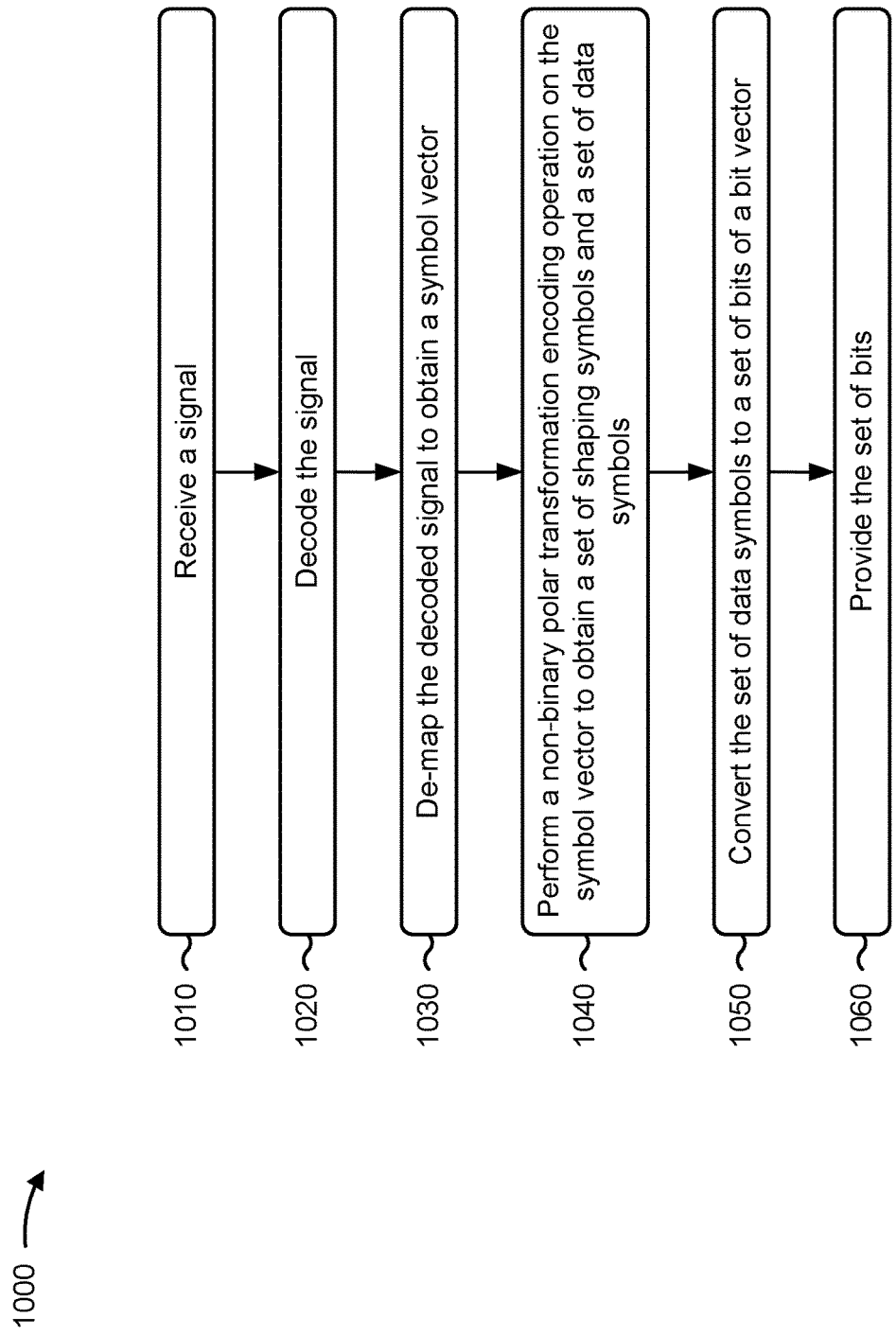
FIG. 10 is a flowchart illustrating an example process performed, for example, at a transmitter or an apparatus of a transmitter that supports PAS using NBPC in accordance with the present disclosure.

FIG. 10 is a flowchart illustrating an example process 1000 performed, for example, at a wireless communication device or an apparatus of a wireless communication device that supports PAS using NBPC in accordance with the present disclosure. Example process 1000 is an example where the apparatus or the wireless communication device (for example, receiver 618) performs operations associated with PAS using NBPCs.

Figure 11:
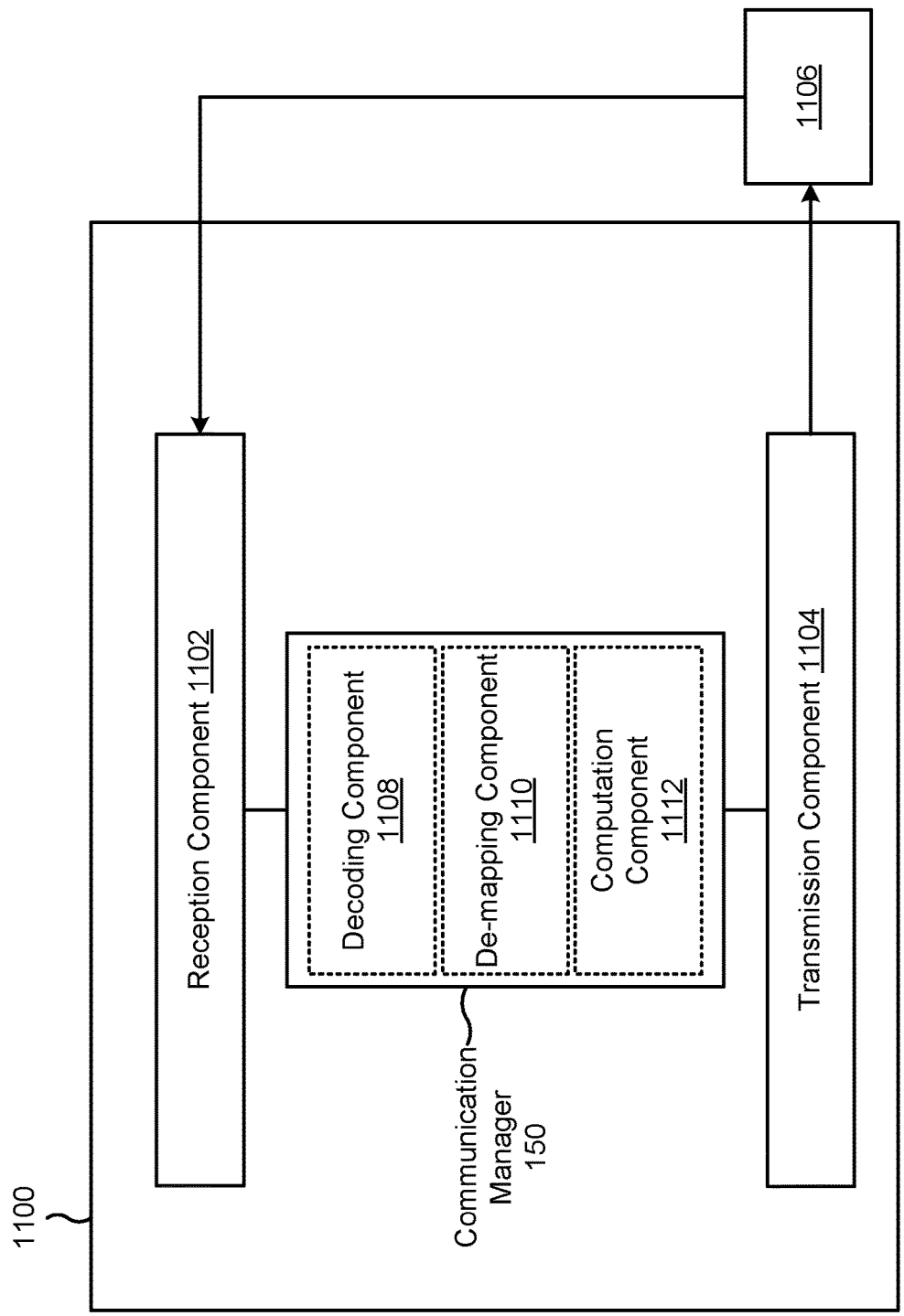
FIG. 11 is a diagram of an example apparatus for wireless communication that supports PAS using NBPC in accordance with the present disclosure.

As shown in FIG. 10, in some aspects, process 1000 may include receiving a signal (block 1010). For example, the apparatus or the wireless communication device (such as by using communication manager 150 or reception component 1102, depicted in FIG. 11) may receive a signal, as described above.

As further shown in FIG. 10, in some aspects, process 1000 may include decoding the signal (block 1020). For example, the wireless communication device or the apparatus (such as by using communication manager 150 or decoding component 1108, depicted in FIG. 11) may decode the signal, as described above.

As further shown in FIG. 10, in some aspects, process 1000 may include de-mapping the decoded signal to obtain a symbol vector (block 1030). For example, the wireless communication device or the apparatus (such as by using communication manager 150 or de-mapping component 1110, depicted in FIG. 11) may de-map (such as demodulate or soft demodulate) the decoded signal to obtain a symbol vector, as described above.

As further shown in FIG. 10, in some aspects, process 1000 may include performing a non-binary polar transformation encoding operation on the symbol vector to obtain a set of shaping symbols and a set of data symbols (block 1040). For example, the wireless communication device or the apparatus (such as by using communication manager 150 or computation component 1112, depicted in FIG. 11) may perform a non-binary polar transformation encoding operation on the symbol vector to obtain a set of shaping symbols and a set of data symbols, as described above. In some aspects, the set of shaping symbols is associated with a set of amplitude shaping target values. In some aspects, the non-binary polar transformation encoding operation uses a generator matrix, and wherein the set of shaping symbols is generated using an inverse of the generator matrix.

As further shown in FIG. 10, in some aspects, process 1000 may include converting the set of data symbols to a set of bits of a bit vector (block 1050). For example, the wireless communication device or the apparatus (such as by using communication manager 150 or computation component 1112, depicted in FIG. 11) may convert the set of data symbols to a set of bits of a bit vector, as described above. In some aspects, the set of data symbols is associated with a uniform probability distribution with regard to values of the set of data symbols, and wherein the symbol vector is associated with a non-uniform probability distribution with regard to values of symbols of the symbol vector.

As further shown in FIG. 10, in some aspects, process 1000 may include providing the set of bits (block 1060). For example, the wireless communication device or the apparatus (such as by using communication manager 150 or computation component 1112, depicted in FIG. 11) may provide the set of bits, as described above.

Although FIG. 10 shows example blocks of process 1000, in some aspects, process 1000 may include additional blocks, fewer blocks, different blocks, or differently arranged blocks than those depicted in FIG. 10. Additionally or alternatively, two or more of the blocks of process 1000 may be performed in parallel.

The following provides an overview of some Aspects of the present disclosure:

Aspect 1: A method of wireless communication performed by a wireless communication device, comprising: performing a first non-binary polar transformation encoding operation on a first symbol vector, including a set of data symbols, that generates a second symbol vector including a set of transformed data symbols, the set of data symbols being associated with frozen locations associated with the first non-binary polar transformation encoding operation; performing a non-binary polar transformation decoding operation on the second symbol vector, in accordance with a set of probability values associated with a set of amplitude shaping target values, that generates a third symbol vector including a first set of shaping symbols; performing a second non-binary polar transformation encoding operation on the third symbol vector that generates a fourth symbol vector including a second set of shaping symbols, the second set of shaping symbols being associated with information locations associated with the second non-binary polar transformation encoding operation; and transmitting a signal that is modulated in accordance with a fifth symbol vector including a set of shaped symbols associated with a combination of the second symbol vector and the fourth symbol vector.

Aspect 2: The method of Aspect 1, wherein the first symbol vector is associated with a uniform probability distribution with regard to values of the set of data symbols, and wherein the fifth symbol vector is associated with a non-uniform probability distribution with regard to values of the set of shaped symbols.

Aspect 3: The method of any of Aspects 1-2, further comprising: combining, prior to transmitting the signal, the second symbol vector and the fourth symbol vector to generate the fifth symbol vector comprising the set of shaped symbols.

Aspect 4: The method of any of Aspects 1-3, further comprising: obtaining, prior to performing the first non-binary polar transformation encoding operation, a bit vector including a quantity of bits; and converting the bit vector to the first symbol vector including the set of data symbols.

Aspect 5: The method of any of Aspects 1-4, further comprising computing the set of probability values for the second symbol vector according to the set of amplitude shaping target values.

Aspect 6: The method of Aspect 5, wherein each symbol of the set of data symbols has q possible values, and wherein the set of probability values includes q values.

Aspect 7: The method of Aspect 5, wherein each symbol of the set of data symbols has q possible values, and wherein the set of probability values includes fewer than q values.

Aspect 8: The method of Aspect 7, wherein the set of probability values includes fewer than q values in accordance with a normalization operation.

Aspect 9: The method of Aspect 5, wherein computing the set of probability values comprises generating a log probability mass function using the second symbol vector and the set of amplitude shaping target values.

Aspect 10: The method of any of Aspects 1-9, wherein the set of probability values are defined by a log probability mass function.

Aspect 11: The method of any of Aspects 1-10, wherein the non-binary polar transformation decoding operation is associated with at least one of: a successive cancellation decoder, a successive cancellation list decoder, or a belief propagation decoder.

Aspect 12: The method of any of Aspects 1-11, wherein performing the non-binary polar transformation decoding operation comprises performing the non-binary polar transformation decoding operation on one or more transformed data symbols of the set of transformed data symbols.

Aspect 13: The method of Aspect 12, wherein one or more transformed data symbols are on information locations associated with the non-binary polar transformation decoding operation.

Aspect 14: A method of wireless communication performed by a wireless communication device, comprising: receiving a signal; decoding the signal; de-mapping the decoded signal to obtain a symbol vector; performing a non-binary polar transformation encoding operation on the symbol vector to obtain a set of shaping symbols and a set of data symbols; converting the set of data symbols to a set of bits of a bit vector; and providing the set of bits.

Aspect 15: The method of Aspect 14, wherein the set of shaping symbols is associated with a set of amplitude shaping target values.

Aspect 16: The method of Aspect 15, wherein the non-binary polar transformation encoding operation uses a generator matrix, and wherein the symbol vector is generated using an inverse of the generator matrix.

Aspect 17: The method of any of Aspects 14-16, wherein the set of data symbols is associated with a uniform probability distribution with regard to values of the set of data symbols, and wherein the symbol vector is associated with a non-uniform probability distribution with regard to values of symbols of the symbol vector.

Aspect 18: An apparatus for wireless communication at a device, the apparatus comprising one or more processors; one or more memories coupled with the one or more processors; and instructions stored in the one or more memories and executable by the one or more processors to cause the apparatus to perform the method of one or more of Aspects 1-17.

Aspect 19: An apparatus for wireless communication at a device, the apparatus comprising one or more memories and one or more processors coupled to the one or more memories, the one or more processors configured to cause the device to perform the method of one or more of Aspects 1-17.

Aspect 20: An apparatus for wireless communication, the apparatus comprising at least one means for performing the method of one or more of Aspects 1-17.

Aspect 21: A non-transitory computer-readable medium storing code for wireless communication, the code comprising instructions executable by one or more processors to perform the method of one or more of Aspects 1-17.

Aspect 22: A non-transitory computer-readable medium storing a set of instructions for wireless communication, the set of instructions comprising one or more instructions that, when executed by one or more processors of a device, cause the device to perform the method of one or more of Aspects 1-17.

Aspect 23: A device for wireless communication, the device comprising a processing system that includes one or more processors and one or more memories coupled with the one or more processors, the processing system configured to cause the device to perform the method of one or more of Aspects 1-17.

Aspect 24: An apparatus for wireless communication at a device, the apparatus comprising one or more memories and one or more processors coupled to the one or more memories, the one or more processors individually or collectively configured to cause the device to perform the method of one or more of Aspects 1-17.

The foregoing disclosure provides illustration and description but is not intended to be exhaustive or to limit the aspects to the precise forms disclosed. Modifications and variations may be made in light of the above disclosure or may be acquired from practice of the aspects.

As used herein, the term "component" is intended to be broadly construed as hardware or a combination of hardware and at least one of software or firmware. "Software" shall be construed broadly to mean instructions, instruction sets, code, code segments, program code, programs, subprograms, software modules, applications, software applications, software packages, routines, subroutines, objects, executables, threads of execution, procedures, or functions, among other examples, whether referred to as software, firmware, middleware, microcode, hardware description language, or otherwise. As used herein, a "processor" is implemented in hardware or a combination of hardware and software. It will be apparent that systems or methods described herein may be implemented in different forms of hardware or a combination of hardware and software. The actual specialized control hardware or software code used to implement these systems or methods is not limiting of the aspects. Thus, the operation and behavior of the systems or methods are described herein without reference to specific software code, because those skilled in the art will understand that software and hardware can be designed to implement the systems or methods based, at least in part, on the description herein. A component being configured to perform a function means that the component has a capability to perform the function, and does not require the function to be actually performed by the component, unless noted otherwise.

As used herein, "satisfying a threshold" may, depending on the context, refer to a value being greater than the threshold, greater than or equal to the threshold, less than the threshold, less than or equal to the threshold, equal to the threshold, or not equal to the threshold, among other examples.

As used herein, a phrase referring to "at least one of" a list of items refers to any combination of those items, including single members. As an example, "at least one of: a, b, or c" is intended to cover a, b, c, a+b, a+c, b+c, and a+b+c, as well as any combination with multiples of the same element (for example, a+a, a+a+a, a+a+b, a+a+c, a+b+b, a+c+c, b+b, b+b+b, b+b+c, c+c, and c+c+c, or any other ordering of a, b, and c).

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the terms "set" and "group" are intended to include one or more items and may be used interchangeably with "one or more." Where only one item is intended, the phrase "only one" or similar language is used. Also, as used herein, the terms "has," "have," "having," and similar terms are intended to be open-ended terms that do not limit an element that they modify (for example, an element "having" A may also have B). Further, the phrase "based on" is intended to mean "based on or otherwise in association with" unless explicitly stated otherwise. Also, as used herein, the term "or" is intended to be inclusive when used in a series and may be used interchangeably with "and/or," unless explicitly stated otherwise (for example, if used in combination with "either" or "only one of"). It should be understood that "one or more" is equivalent to "at least one."

Even though particular combinations of features are recited in the claims or disclosed in the specification, these combinations are not intended to limit the disclosure of various aspects. Many of these features may be combined in ways not specifically recited in the claims or disclosed in the specification. The disclosure of various aspects includes each dependent claim in combination with every other claim in the claim set.

What is claimed is:

1. A wireless communication device, comprising:
a processing system that includes one or more processors and one or more memories coupled with the one or more processors, the processing system configured to cause the wireless communication device to:
perform a first non-binary polar transformation encoding operation on a first symbol vector, including a set of data symbols, that generates a second symbol vector including a set of transformed data symbols, the set of data symbols being associated with first locations associated with the first non-binary polar transformation encoding operation;
perform a non-binary polar transformation decoding operation on the second symbol vector, in accordance with a set of probability values associated with a set of amplitude shaping target values, that generates a third symbol vector including a first set of shaping symbols;
perform a second non-binary polar transformation encoding operation on the third symbol vector that generates a fourth symbol vector including a second set of shaping symbols, the second set of shaping symbols being associated with second locations associated with the second non-binary polar transformation encoding operation; and
transmit a signal that is modulated in accordance with a fifth symbol vector including a set of shaped symbols associated with a combination of the second symbol vector and the fourth symbol vector.

2. The wireless communication device of claim 1, wherein the first locations comprise lower-reliability bit locations associated with the first non-binary polar transformation encoding operation and the second locations comprise higher-reliability bit locations associated with the second non-binary polar transformation encoding operation.

3. The wireless communication device of claim 1, wherein the first symbol vector is associated with a uniform probability distribution with regard to values of the set of data symbols, and wherein the fifth symbol vector is associated with a non-uniform probability distribution with regard to values of the set of shaped symbols.

4. The wireless communication device of claim 1, wherein the processing system is configured to cause the wireless communication device to:
combine, prior to transmitting the signal, the second symbol vector and the fourth symbol vector to generate the fifth symbol vector comprising the set of shaped symbols.

5. The wireless communication device of claim 1, wherein the processing system is configured to cause the wireless communication device to:
obtain, prior to performing the first non-binary polar transformation encoding operation, a bit vector including a quantity of bits; and
convert the bit vector to the first symbol vector including the set of data symbols.

6. The wireless communication device of claim 1, wherein the processing system is configured to cause the wireless communication device to compute the set of probability values for the second symbol vector according to the set of amplitude shaping target values.

7. The wireless communication device of claim 6, wherein:
each symbol of the set of data symbols has q possible values;
the set of probability values includes q values; and
q is a positive integer.

8. The wireless communication device of claim 6, wherein;
each symbol of the set of data symbols has q possible values; and
the set of probability values includes fewer than q values.

9. The wireless communication device of claim 8, wherein the set of probability values includes fewer than q values in accordance with a normalization operation.

10. The wireless communication device of claim 6, wherein, to cause the wireless communication device to compute the set of probability values, the processing system is configured to cause the wireless communication device to generate a log probability mass function using the second symbol vector and the set of amplitude shaping target values.

11. The wireless communication device of claim 1, wherein the set of probability values are defined by a log probability mass function.

12. The wireless communication device of claim 1, wherein the non-binary polar transformation decoding operation is associated with at least one of:
- a successive cancellation decoder,
- a successive cancellation list decoder, or
- a belief propagation decoder.

13. The wireless communication device of claim 1, wherein, to cause the wireless communication device to perform the non-binary polar transformation decoding operation, the processing system is configured to cause the wireless communication device to perform the non-binary polar transformation decoding operation on one or more transformed data symbols of the set of transformed data symbols.

14. The wireless communication device of claim 13, wherein the one or more transformed data symbols are on information locations associated with the non-binary polar transformation decoding operation.

15. A method of wireless communication by a wireless communication device, comprising:
- performing a first non-binary polar transformation encoding operation on a first symbol vector, including a set of data symbols, that generates a second symbol vector including a set of transformed data symbols, the set of data symbols being associated with first locations associated with the first non-binary polar transformation encoding operation;
- performing a non-binary polar transformation decoding operation on the second symbol vector, in accordance with a set of probability values associated with a set of amplitude shaping target values, that generates a third symbol vector including a first set of shaping symbols;
- performing a second non-binary polar transformation encoding operation on the third symbol vector that generates a fourth symbol vector including a second set of shaping symbols, the second set of shaping symbols being associated with second locations associated with the second non-binary polar transformation encoding operation; and
- transmitting a signal that is modulated in accordance with a fifth symbol vector including a set of shaped symbols associated with a combination of the second symbol vector and the fourth symbol vector.

16. The method of claim 15, wherein the first locations comprise lower-reliability bit locations associated with the first non-binary polar transformation encoding operation and the second locations comprise higher-reliability bit locations associated with the second non-binary polar transformation encoding operation.

17. The method of claim 15, wherein:
- the first symbol vector is associated with a uniform probability distribution with regard to values of the set of data symbols; and
- the fifth symbol vector is associated with a non-uniform probability distribution with regard to values of the set of shaped symbols.

18. The method of claim 15, further comprising:
- combining, prior to transmitting the signal, the second symbol vector and the fourth symbol vector to generate the fifth symbol vector comprising the set of shaped symbols.

19. The method of claim 15, further comprising:
- obtaining, prior to performing the first non-binary polar transformation encoding operation, a bit vector including a quantity of bits; and
- converting the bit vector to the first symbol vector including the set of data symbols.

20. The method of claim 15, further comprising:
- computing the set of probability values for the second symbol vector according to the set of amplitude shaping target values.

21. The method of claim 20, wherein;
- each symbol of the set of data symbols has q possible values;
- the set of probability values includes q values; and
- q is a positive integer.

22. The method of claim 20, wherein:
- each symbol of the set of data symbols has q possible values; and
- the set of probability values includes fewer than q values.

23. The method of claim 22, wherein the set of probability values includes fewer than q values in accordance with a normalization operation.

24. The method of claim 20, wherein computing the set of probability values comprises generating a log probability mass function using the second symbol vector and the set of amplitude shaping target values.

25. The method of claim 15, wherein the set of probability values are defined by a log probability mass function.

26. The method of claim 15, wherein the non-binary polar transformation decoding operation is associated with at least one of:
- a successive cancellation decoder,
- a successive cancellation list decoder, or
- a belief propagation decoder.

27. The method of claim 15, wherein performing the non-binary polar transformation decoding operation comprises performing the non-binary polar transformation decoding operation on one or more transformed data symbols of the set of transformed data symbols.

28. The method of claim 27, wherein the one or more transformed data symbols are on information locations associated with the non-binary polar transformation decoding operation.

29. A non-transitory computer-readable medium storing a set of instructions for wireless communication, the set of instructions comprising:
- one or more instructions that, when executed by one or more processors of a wireless communication device, cause the wireless communication device to:
  - perform a first non-binary polar transformation encoding operation on a first symbol vector, including a set of data symbols, that generates a second symbol vector including a set of transformed data symbols, the set of data symbols being associated with first locations associated with the first non-binary polar transformation encoding operation;
  - perform a non-binary polar transformation decoding operation on the second symbol vector, in accordance with a set of probability values associated with a set of amplitude shaping target values, that generates a third symbol vector including a first set of shaping symbols;
  - perform a second non-binary polar transformation encoding operation on the third symbol vector that generates a fourth symbol vector including a second set of shaping symbols, the second set of shaping symbols being associated with second locations associated with the second non-binary polar transformation encoding operation; and transmit a signal that is modulated in accordance with a fifth symbol vector including a set of shaped symbols associated with a combination of the second symbol vector and the fourth symbol vector.

30. An apparatus for wireless communication, comprising:

means for performing a first non-binary polar transformation encoding operation on a first symbol vector, including a set of data symbols, that generates a second symbol vector including a set of transformed data symbols, the set of data symbols being associated with first locations associated with the first non-binary polar transformation encoding operation;

means for performing a non-binary polar transformation decoding operation on the second symbol vector, in accordance with a set of probability values associated with a set of amplitude shaping target values, that generates a third symbol vector including a first set of shaping symbols;

means for performing a second non-binary polar transformation encoding operation on the third symbol vector that generates a fourth symbol vector including a second set of shaping symbols, the second set of shaping symbols being associated with second locations associated with the second non-binary polar transformation encoding operation; and means for transmitting a signal that is modulated in accordance with a fifth symbol vector including a set of shaped symbols associated with a combination of the second symbol vector and the fourth symbol vector.

* * * * *